(12) United States Patent
Park et al.

(10) Patent No.: US 11,790,698 B2
(45) Date of Patent: Oct. 17, 2023

(54) ELECTRONIC DEVICE FOR RECOGNIZING GESTURE OF USER USING A PLURALITY OF SENSOR SIGNALS

(71) Applicant: Samsung Electronics Co., Ltd., Suwon-si (KR)

(72) Inventors: Sungjin Park, Suwon-si (KR); Cheolo Kim, Suwon-si (KR); Taeyoon Kim, Suwon-si (KR); Wonjoon Cho, Suwon-si (KR); Jinyoup Ahn, Suwon-si (KR); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/084,410

(22) Filed: Oct. 29, 2020

(65) Prior Publication Data

US 2021/0132699 A1 May 6, 2021

(30) Foreign Application Priority Data

Nov. 1, 2019 (KR) .......................... 10-2019-0138408

(51) Int. Cl.
*G06V 40/20* (2022.01)
*G06F 3/01* (2006.01)
(Continued)

(52) U.S. Cl.
CPC .............. *G06V 40/20* (2022.01); *G06F 3/015* (2013.01); *G06F 3/017* (2013.01); *G06F 18/213* (2023.01);
(Continued)

(58) Field of Classification Search
CPC ........ G06F 3/017; G06F 3/015; G06F 3/0346; G06F 3/038; G06F 2203/0384;
(Continued)

(56) References Cited

U.S. PATENT DOCUMENTS 7,647,195 B1* 1/2010 Kahn .................... A63F 13/211
719/329
9,043,251 B2   5/2015 Kim
(Continued)

FOREIGN PATENT DOCUMENTS

JP          2018-506773 A    3/2018
KR    10-2016-0077070 A    7/2016
(Continued)

OTHER PUBLICATIONS

Notification of Transmittal of the International Search Report and the Written Opinion of the International Searching Authority, or the Declaration dated Jan. 20, 2021 in connection with International Patent Application No. PCT/KR2020/013558, 9 pages.

*Primary Examiner* — Daniel W Parcher

(57) ABSTRACT

Disclosed is an electronic device. The electronic device includes a sensor unit that includes a first sensor and a second sensor, and a processor that is operatively connected with the sensor unit. The processor determines whether a given condition is satisfied, by using a first sensor signal of a user sensed by the first sensor, controls the first sensor to sense the first sensor signal every first cycle and controls the second sensor to sense a second sensor signal from the user every second cycle longer than the first cycle when the given condition is not satisfied, controls the second sensor to sense the second sensor signal every third cycle shorter than the second cycle when the given condition is satisfied, and recognize a gesture of the user by using the first sensor signal sensed every first cycle and the second sensor signal sensed every third cycle.

17 Claims, 15 Drawing Sheets

(51) Int. Cl.
*H02M 1/14* (2006.01)
*G06F 18/213* (2023.01)
*G06F 18/241* (2023.01)
*G06V 10/80* (2022.01)

(52) U.S. Cl.
CPC .......... *G06F 18/241* (2023.01); *G06V 10/803* (2022.01); *H02M 1/143* (2013.01)

(58) Field of Classification Search
CPC .. G06K 9/6232; G06K 9/6268; G06K 9/6289; H02M 1/143; G06V 10/82; G06V 30/242; G06V 40/20
See application file for complete search history.

(56) References Cited

U.S. PATENT DOCUMENTS

| | | | |
|---|---|---|---|
| 9,354,709 B1* | 5/2016 | Heller | G06F 1/1694 |
| 9,389,690 B2 | 7/2016 | Li et al. | |
| 10,126,829 B2 | 11/2018 | Ofir et al. | |
| 10,332,011 B2 | 6/2019 | Kim | |
| 10,671,176 B2 | 6/2020 | Baranski et al. | |
| 2008/0163130 A1* | 7/2008 | Westerman | G06F 3/04883 |
| | | | 715/863 |
| 2009/0099812 A1* | 4/2009 | Kahn | H04M 1/72403 |
| | | | 702/152 |
| 2011/0148669 A1 | 6/2011 | Kang et al. | |
| 2013/0265218 A1 | 10/2013 | Moscarillo | |
| 2014/0309871 A1* | 10/2014 | Ricci | G06Q 50/30 |
| | | | 701/36 |
| 2015/0057967 A1* | 2/2015 | Albinali | A61B 5/1118 |
| | | | 702/150 |
| 2015/0205946 A1* | 7/2015 | Aurongzeb | G06F 3/0346 |
| | | | 726/19 |
| 2015/0346833 A1 | 12/2015 | Jiang et al. | |
| 2015/0363639 A1* | 12/2015 | Stanek | G06F 3/0346 |
| | | | 382/103 |
| 2016/0091980 A1 | 3/2016 | Baranski et al. | |
| 2016/0124512 A1 | 5/2016 | Maruya et al. | |
| 2016/0202724 A1 | 7/2016 | Chang et al. | |
| 2016/0357265 A1 | 12/2016 | Maani | |
| 2017/0156677 A1* | 6/2017 | Nakanishi | A61B 5/349 |
| 2020/0135320 A1* | 4/2020 | Vleugels | G16H 50/20 |
| 2020/0158556 A1* | 5/2020 | Strutt | G01S 7/52004 |
| 2021/0229199 A1* | 7/2021 | Colombo | B64F 5/40 |

FOREIGN PATENT DOCUMENTS

| | | |
|---|---|---|
| KR | 10-1685388 B1 | 12/2016 |
| KR | 10-2018-0106433 A | 10/2018 |
| KR | 10-1969450 B1 | 4/2019 |

* cited by examiner

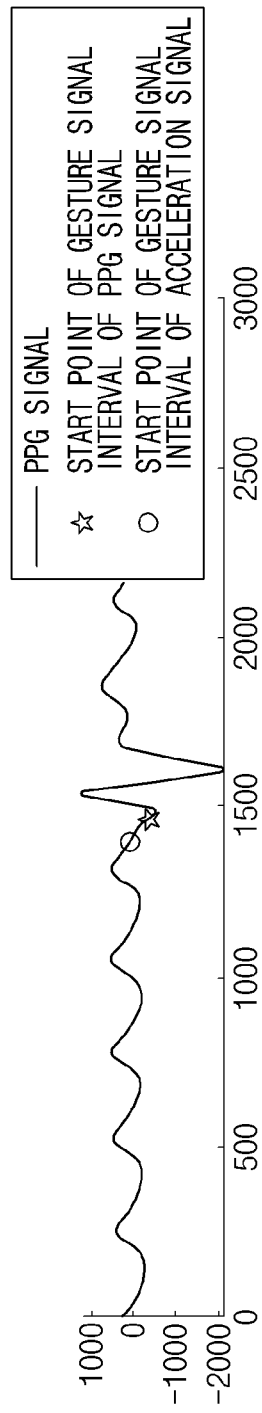
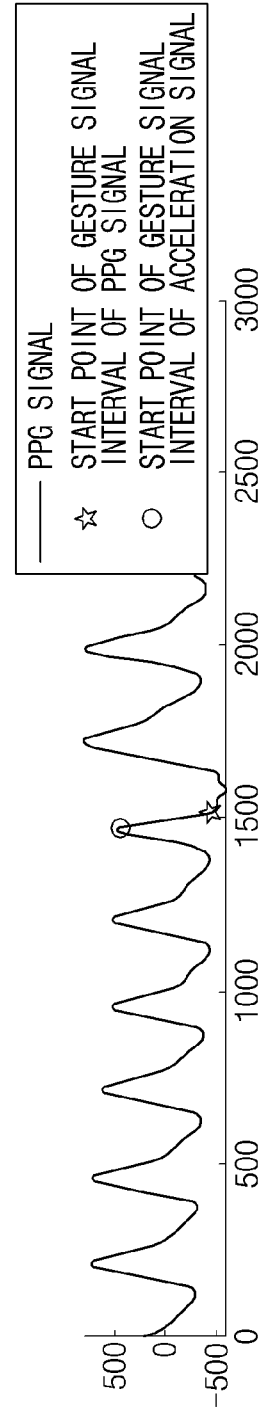
FIG. 8A
FIG. 8B

ELECTRONIC DEVICE FOR RECOGNIZING GESTURE OF USER USING A PLURALITY OF SENSOR SIGNALS

CROSS-REFERENCE TO RELATED APPLICATION

This application is based on and claims priority under 35 U.S.C. § 119 to Korean Patent Application No. 10-2019-0138408, filed on Nov. 1, 2019, in the Korean Intellectual Property Office, the disclosure of which is incorporated by reference herein its entirety.

BACKGROUND

1. Field

The disclosure relates to an electronic device capable of recognizing a gesture of a user by using a plurality of sensor signals.

2. Description of Related Art

Among user interface technologies, a technology for recognizing a gesture of a user may use an image obtained from an image sensor or an inertial measurement unit (IMU) such as an acceleration sensor and a gyro sensor.

In particular, compared to a way to use an image, a way to use an inertial measurement unit may be applied to a wearable device that the user is capable of wearing so as to be available anytime and anywhere, thus making the degree of freedom high.

The above information is presented as background information only to assist with an understanding of the disclosure. No determination has been made, and no assertion is made, as to whether any of the above might be applicable as prior art with regard to the disclosure.

SUMMARY

According to a conventional way to use the inertial measurement unit, in particular, a way to recognize a gesture by using an acceleration sensor, a gesture has been recognized by using a change in an acceleration value when the user's forearm moves.

However, the conventional way to use the inertial measurement unit fails to finely sense the movement variation of a joint of his/her finger or hand. For example, in the case where the user makes a gesture that his/her forearm moves from side to side, with the acceleration sensor of the wearable device mounted on the forearm of the user, the variations of acceleration (e.g., the x-axis, y-axis, and z-axis variations of the acceleration signal) may be great. However, in the case where the user makes a gesture that only his/her finger moves, with his/her wrist fixed, the movement of the user's forearm or wrist may be relatively small. In this case, because the variations of acceleration are small, it may be difficult to recognize the gesture accurately.

Also, even though the user makes the same gesture, because different results are sensed due to various environmental and situational factors, such as a change in a distance between the inertial measurement unit and his/her skin due to a location where the user wears the wearable device, a wearing strength, and a position and an instantaneous movement of the user's hand making a gesture, the conventional way to use the inertial measurement unit may fail to recognize a gesture accurately.

Aspects of the disclosure are to address at least the above-mentioned problems and/or disadvantages and to provide at least the advantages described below. Accordingly, an aspect of the disclosure is to provide an electronic device for recognizing a gesture of a user by using a plurality of sensor signals so as to accurately recognize the gesture of the user.

In accordance with an aspect of the disclosure, an electronic device may include a sensor unit that includes a first sensor and a second sensor, and a processor that is operatively connected with the sensor unit. The processor may determine whether a given condition is satisfied, by using a first sensor signal of a user sensed by the first sensor, may control the first sensor to sense the first sensor signal every first cycle and may control the second sensor to sense a second sensor signal from the user every second cycle longer than the first cycle when the given condition is not satisfied, may control the second sensor to sense the second sensor signal every third cycle shorter than the second cycle when the given condition is satisfied, and may recognize a gesture of the user by using the first sensor signal sensed every first cycle and the second sensor signal sensed every third cycle.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B is a diagram illustrating an example in which one sensor signal generated according to the same gesture operation has different waveforms, at an electronic device according to various embodiments;

In the description of the drawings, the same or similar reference numerals may be used for the same or similar components.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments will be described with reference to accompanying drawings. However, this is not intended to limit the technologies described in the disclosure to specific embodiments, and it should be understood to include various modifications, equivalents, and/or alternatives of the embodiments.

Figure 1:
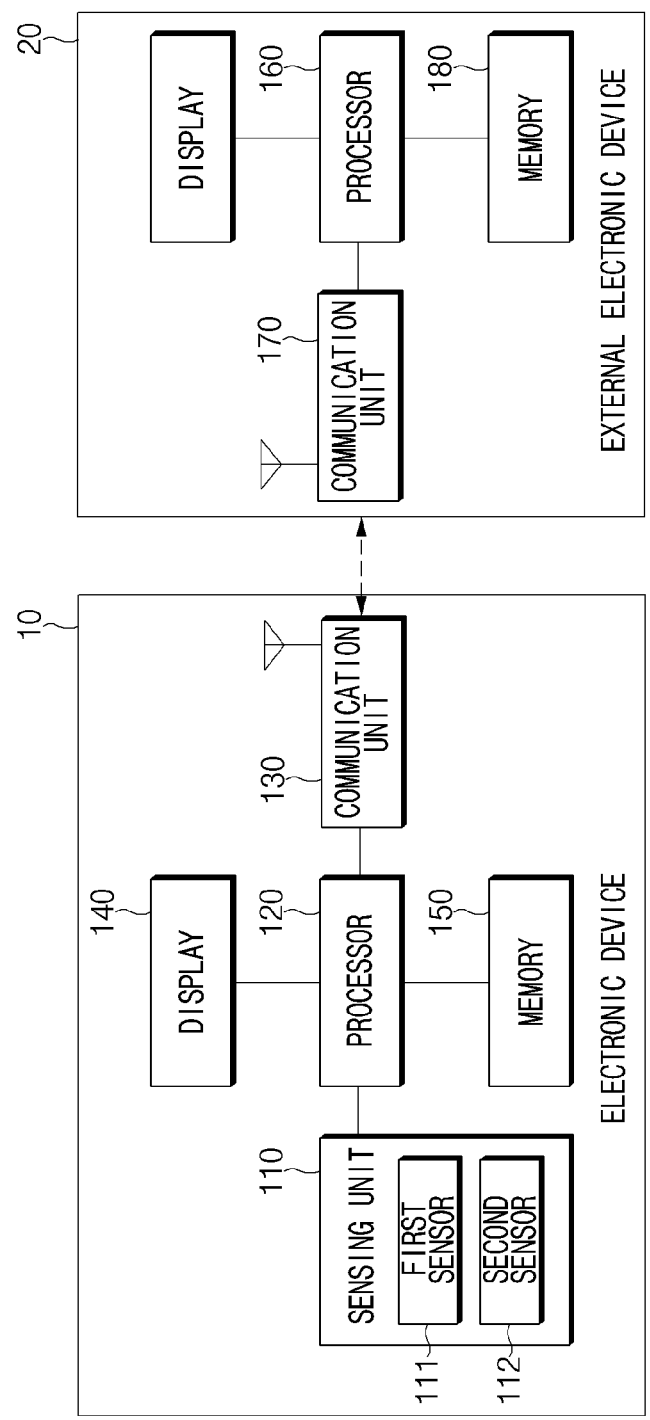
FIG. 1 is a diagram illustrating an electronic device according to an embodiment and an external electronic device correctable with the electronic device.

FIG. 1 is a diagram illustrating an electronic device 10 (e.g., an electronic device 1501 of FIG. 15) according to an embodiment and an external electronic device 20 connectable with the electronic device 10.

Figure 15:
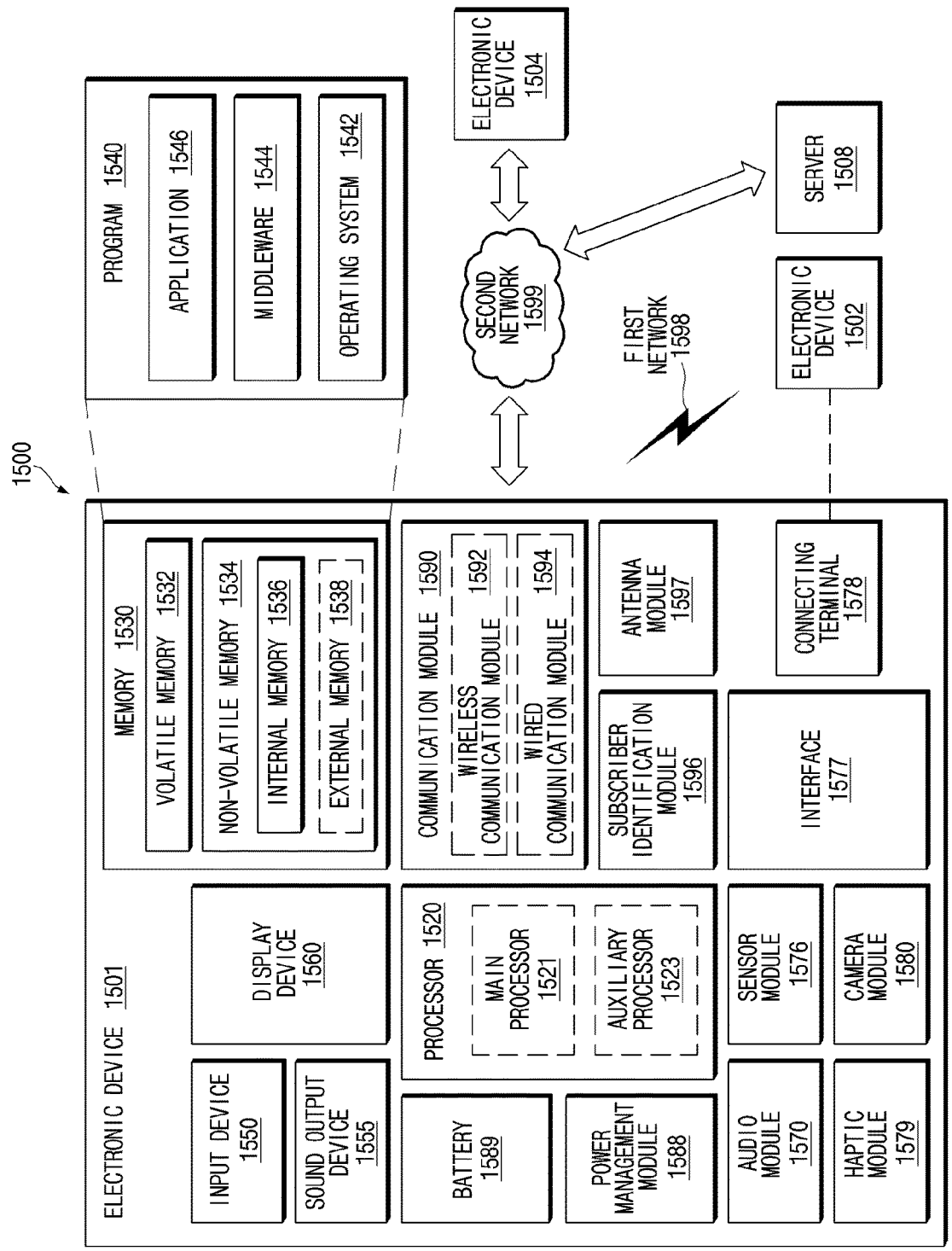
FIG. 15 is a block diagram illustrating an electronic device in a network environment according to various embodiments.

Referring to FIG. 1, the electronic device 10 according to an embodiment can include a sensor unit 110 (e.g., a sensor module 1576 of FIG. 15), a processor 120 (e.g., a processor 1520 of FIG. 15), a communication unit 130 (e.g., a communication module 1590 of FIG. 15), a display 140 (e.g., a display device 1560 of FIG. 15), and a memory 150 (e.g., a memory 1530 of FIG. 15).

The electronic device 10 according to an embodiment can be a wearable device, but the disclosure is not limited thereto. For example, the electronic device 10 can be a portable terminal, such as a smartphone or a tablet, a patch, a sticker device, or an implantable device.

In an embodiment, the sensor unit 110 can be disposed within at least a portion of a housing of the electronic device 10 and can sense at least one of an inertial signal (e.g., an acceleration signal, an angular velocity signal, and a geomagnetic signal) and a biometric signal (e.g., a heartbeat signal and an electrocardiogram signal) of a user. For example, the sensor unit 110 can include at least one of an acceleration sensor, a photoplethysmography (PPG) sensor, a gyro sensor, a geomagnetic sensor, and an electrocardiogram sensor.

In an embodiment, the sensor unit 110 can include a plurality of sensors (e.g., a first sensor 111 and a second sensor 112) for the purpose of sensing a plurality of sensor signals from the user as data for recognizing a gesture of the user. An embodiment is illustrated in FIG. 1 as the sensor unit 110 includes two sensors (i.e., the first sensor 111 and the second sensor 112), but the disclosure is not limited thereto. For example, the sensor unit 110 can be composed of three or more sensors in consideration of various factors such as accuracy necessary for gesture recognition, and a size and a performance of the electronic device 10.

According to various embodiments, the sensor unit 110 can include an ECG sensor. The ECG sensor can sense a pulse wave that is generated when blood ejected by the contraction of the heart flows along an artery.

In various embodiments, the sensor unit 110 can include a PPG sensor. The PPG sensor can measure an arterial pressure or a heartbeat of the user by emitting a light of a specific wavelength band to the user's body and sensing the amount of light reflected from the user's body or the amount of light transmitted.

In various embodiments, the PPG sensor can include a light receiving unit and a light emitting unit. The PPG sensor can measure a photoplethysmography signal being one of biometric signals of the user by measuring the variations in the amount of blood flowing through a blood vessel noninvasively. A PPG signal sensed by the PPG sensor can include an AC component indicating pulsatile morphology based on a heartbeat of the user and a DC component appearing when the emitted light is reflected by arterial blood, venous blood, and any other tissue or is transmitted therethrough.

In general, blood ejected through the left ventricle of the heart may move to peripheral tissues at the systole, and the amount of arterial blood may increase. Because red blood cells in the blood vessel absorb a green light, the arterial blood may increase at the systole, and the absorbance may be maximized. Accordingly, rather than using the DC component according to the reflection or transmission, the AC component indicating the pulsatile morphology of the heart may mainly appear at the PPG signal.

In an embodiment, the processor 120 can recognize a gesture of the user by using a plurality of sensor signals sensed by the sensor unit 110 and can control each component included in the electronic device 10 in a manner that a function corresponding to the recognized gesture of the user is executed.

In an embodiment, the processor 120 can control operations of the first sensor 111 and the second sensor 112 and can change an operation state of the second sensor 112 depending on whether a given condition is satisfied (e.g., in the case where a state of the display 140 is changed to an on state).

In various embodiments, when the given condition is not satisfied, the processor 120 can control the operation state of the first sensor 111 in a manner that the first sensor 111 senses a first sensor signal from the user every first cycle. Also, the processor 120 can control the operation state of the second sensor 112 in a manner that the second sensor 112 senses a second sensor signal from the user every second cycle longer than the first cycle. In various embodiments, when the given condition is satisfied, the processor 120 can control the second sensor 112 in a manner that the second sensor 112 senses the second sensor signal from the user every third cycle shorter than the second cycle. In an embodiment, the third cycle can be set to be identical to the first cycle.

In various embodiments, the operation state can include an operation state of sensing a sensor signal from the user every first period, an operation state of sensing a sensor signal from the user every second period longer than the first period, and an operation state of sensing a sensor signal from the user every third cycle shorter than the second period. The electronic device 10 can reduce the amount of battery consumed, by controlling at least one sensor (e.g., the second sensor 112) in an operation state of sensing a sensor signal from the user every second cycle longer than the first cycle until the given condition is satisfied.

In various embodiments, when a state in which the given condition is satisfied is maintained (e.g., when the display 140 maintains an on state), the processor 120 can control the second sensor 112 in a manner that the second sensor 112 senses a sensor signal from the user every third cycle (or first cycle). Also, in response to that the state in which the given condition is satisfied is stopped (e.g., that a state of the display 140 is changed from an on state to an off state), the processor 120 can again change a cycle, at which the second sensor 112 senses a sensor signal, to the second cycle.

In an embodiment, the communication unit 130 can support wired/wireless communication with the external electronic device 20. For example, the communication unit 130 can perform wired/wireless communication with the external electronic device 20 by using a communication scheme such as Bluetooth, BLE, ANT+, Wi-Fi, Cellular (LTE, 5G, LTE-M1, or NB-IoT), or NFC. Here, an example is illustrated in FIG. 1 as the communication unit 130 performs wired/wireless communication with one external electronic device 20, but the disclosure is not limited thereto. For example, the communication unit 130 can perform wired/wireless communication with a plurality of external electronic devices at the same time.

In an embodiment, the display 140 can be disposed at at least a portion of the housing of the electronic device 10. The display 140 can change a display state to an on state or an off state depending on a control signal received from the processor 120. For example, the processor 120 can control a display driver integrated circuit (IC) (DDI) included in the display 140 in a manner that the DDI changes a state of the display 140. In various embodiments, the display 140 can output a user interface (UI) capable of manipulating and outputting various functions executable at the electronic device 10; the display 140 can output a message associated with a gesture of the user transferred from the processor 120 or can execute a function corresponding to the gesture of the user.

In an embodiment, the memory 150 can store data or various instructions associated with a control operation of the electronic device 10. The memory 150 can include, but is not limited to, at least one of a volatile memory and a nonvolatile memory. In various embodiments, the memory 150 can store a gesture set in which a plurality of gesture operations are matched with functions respectively corresponding to the plurality of gesture operations and can store a feature value list for each gesture, in which a plurality of sensors are matched with gesture feature values respectively corresponding to kinds of the plurality of sensors. In various embodiments, the memory 150 can store a gesture classification model that outputs a gesture corresponding to a specific feature value by using the specific feature value as an input value.

In an embodiment, the external electronic device 20 can be connected with the communication unit 130 of the electronic device 10 to perform wired/wireless communication (e.g., pairing), and can perform at least one of a plurality of operations for recognizing a gesture of the user depending on a control signal transferred from the processor 120 of the electronic device 10.

In various embodiments, when the electronic device 10 and the external electronic device 20 are paired, the external electronic device 20 can perform a function corresponding to a gesture of the user depending on an indication (e.g., a flag composed of one or more bits), which corresponds to the gesture of the user and is transferred from the electronic device 10, or an instruction (e.g., an instruction associated with the function corresponding to the gesture of the user recognized based on the gesture set of the electronic device 10). In this case, the electronic device 10 can transfer only a recognized gesture. In the case of transferring only the recognized gesture, a gesture set can be present in a memory 180 of the external electronic device 20.

In various embodiments, without connection with the external electronic device 20, the electronic device 10 can independently perform a plurality of operations and a plurality of functions for the purpose of recognizing a gesture of the user.

In various embodiments, the electronic device 10 can be a wearable device that the user is capable of mounting on his/her wrist, and the external electronic device 20 can be a portable terminal of the user, such as a smartphone, or an in-vehicle infotainment system. However, the disclosure is not limited thereto.

Figure 2:
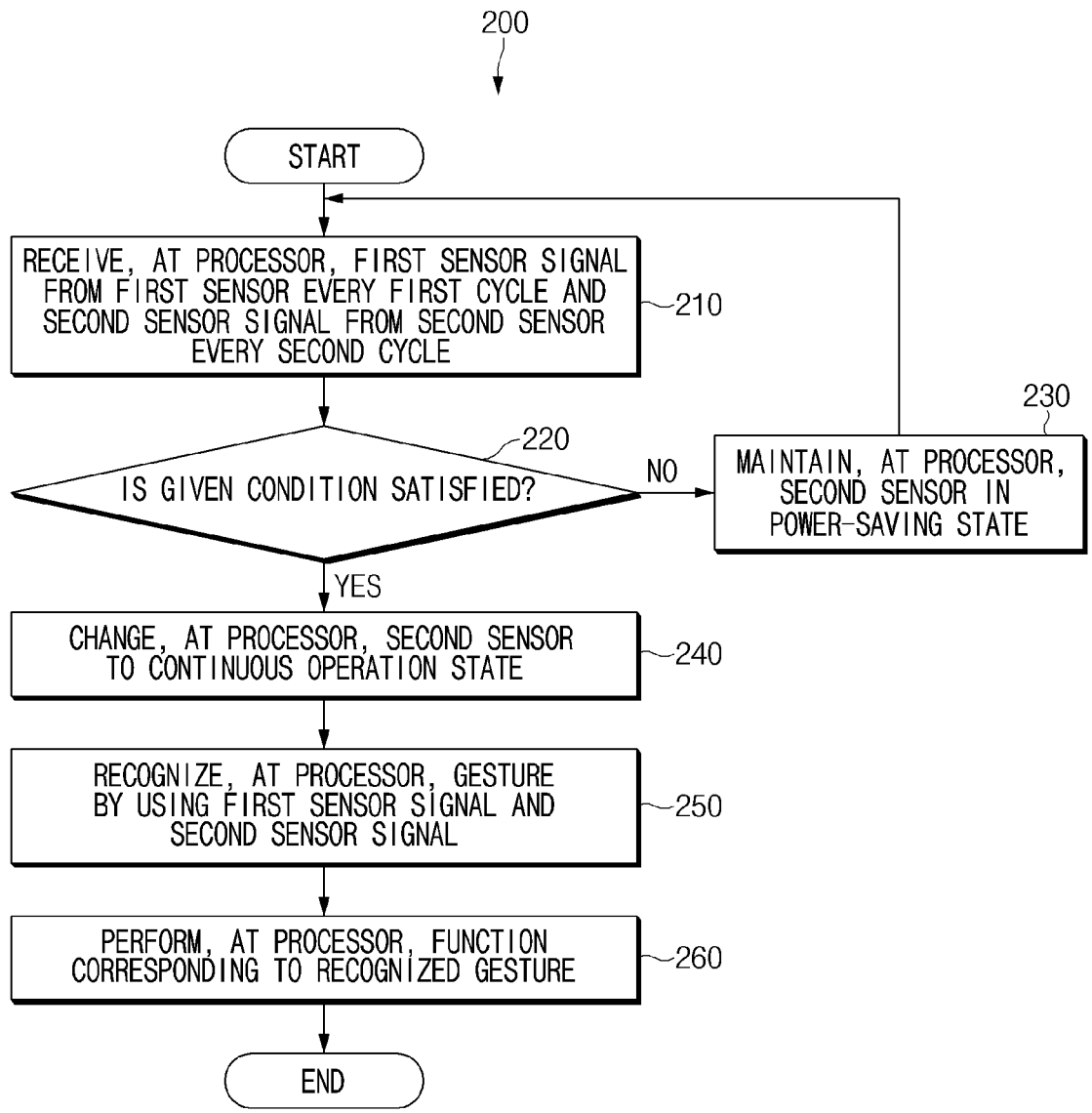
FIG. 2 is a flowchart of a method in which an electronic device according to an embodiment recognizes a gesture by using a plurality of sensor signals.

FIG. 2 is a flowchart of a method 200 in which the electronic device 10 (e.g., the electronic device 10 of FIG. 1 or the electronic device 1501 of FIG. 15) according to an embodiment recognizes a gesture by using a plurality of sensor signals.

Referring to FIG. 2, according to an embodiment, in operation 210, the processor 120 of the electronic device 10 can control the first sensor 111 to sense the first sensor signal every first cycle and can receive the first sensor signal from the first sensor 111 every first cycle; the processor 120 of the electronic device 10 can control the second sensor 112 to sense the second sensor signal every second cycle and can receive the second sensor signal from the second sensor 112 every second cycle. In an embodiment, for example, the first sensor 111 can include an acceleration sensor to sense an acceleration signal of the user, and the electronic device 10 can control the acceleration sensor in a manner that the acceleration sensor senses the acceleration signal of the user every first cycle. Also, the second sensor 112 can include a PPG sensor or an ECG sensor to sense a PPG signal of the user, and the electronic device 10 can control the PPG sensor in a manner that the PPG sensor senses the PPG signal of the user every second cycle longer than the first cycle. In various embodiments, the electronic device 10 can control the first sensor 111 and the second sensor 112 so as to operate in a state where a power consumption amount of the second sensor 112 is smaller than a power consumption amount of the first sensor 111.

According to an embodiment, in operation 220, the processor 120 can determine whether a given condition is satisfied. In various embodiments, the given condition can be whether the user prepares an operation (or a preparation operation) for executing a specific function of the electronic device 10 or the external electronic device 20 paired with the electronic device 10 (e.g., whether the display 140 changes from an off state to an on state or whether an acceleration signal has a specified value or more when the first sensor signal is the acceleration signal). For example, in response to that the display 140 changes from an off state to an on state or that the acceleration signal has the specified value or more, the electronic device 10 can determine that the given condition is satisfied. The given condition is not limited to whether to perform the preparation operation. For example, according to various embodiments of the disclosure, it may be easily understood by one skilled in the art that any condition is included in the given condition without limitation, if there is determined whether the user performs the preparation operation for executing a specific function of the electronic device 10 or the external electronic device 20 paired with the electronic device 10.

According to an embodiment, when it is determined in operation 220 that the given condition is not satisfied (NO), in operation 230, the processor 120 can maintain the second cycle being a cycle at which the second sensor 112 senses the second sensor signal and can receive the second sensor signal from the second sensor 112 every second cycle. Also, the processor 120 can allow the second sensor 112 not to sense the second sensor signal from the user by maintaining the second sensor 112 at a halt state in which the second sensor signal is not sensed. For example, as a minimum number of sensors (e.g., the first sensor 111) are used in a situation where the user does not gesture, a battery of the electronic device 10 can be saved, and a lifetime of a sensor may be extended.

According to an embodiment, when it is determined in operation 220 that the given condition is satisfied, in operation 240, the processor 120 can change the cycle, at which the second sensor 112 senses the second sensor signal, from the second cycle to the first cycle and can receive the second sensor signal from the second sensor 112 every first cycle. In various embodiments, in the case where the user gestures, sensors of a halt state (e.g., a state where an operation for sensing a sensor signal from the user is not performed) can be additionally operated to recognize a gesture of the user (or a cycle of a sensor (e.g., the second sensor 112) to sense a sensor signal every second cycle can be changed to the third cycle (or the first cycle)), and the gesture can be recognized by using a plurality of sensor signals sensed by a plurality of sensors. As such, the accuracy of recognition can become higher than when only a single sensor (e.g., the first sensor 111) is used.

According to an embodiment, in operation 250, the processor 120 can recognize the gesture of the user by using the first sensor signal sensed by the first sensor 111 in real time and the second sensor signal sensed by the second sensor 112 in real time.

According to an embodiment, in operation 260, the processor 120 can control each component included in the electronic device 10 in a manner that a function corresponding to the gesture of the user recognized in operation 250 is performed. In various embodiments, when the electronic device 10 is paired with the external electronic device 20 and the function corresponding to the gesture of the user recognized in operation 250 is a function of the external electronic device 20, the processor 120 can transfer an indication corresponding to the recognized gesture of the user or an instruction ordering the execution of the function corresponding to the recognized gesture of the user to the external electronic device 20 through the communication unit 130. In response to the indication or instruction transferred from the processor 120, the external electronic device 20 can control each component of the external electronic device 20 in a manner that the function corresponding to the gesture of the user is executed.

In various embodiments, although not illustrated, when it is determined in operation 220 that the given condition is not satisfied (NO), the processor 120 can perform an operation for recognizing a gesture of the user by using only the first sensor signal sensed by the first sensor 111 in real time.

Figure 3:
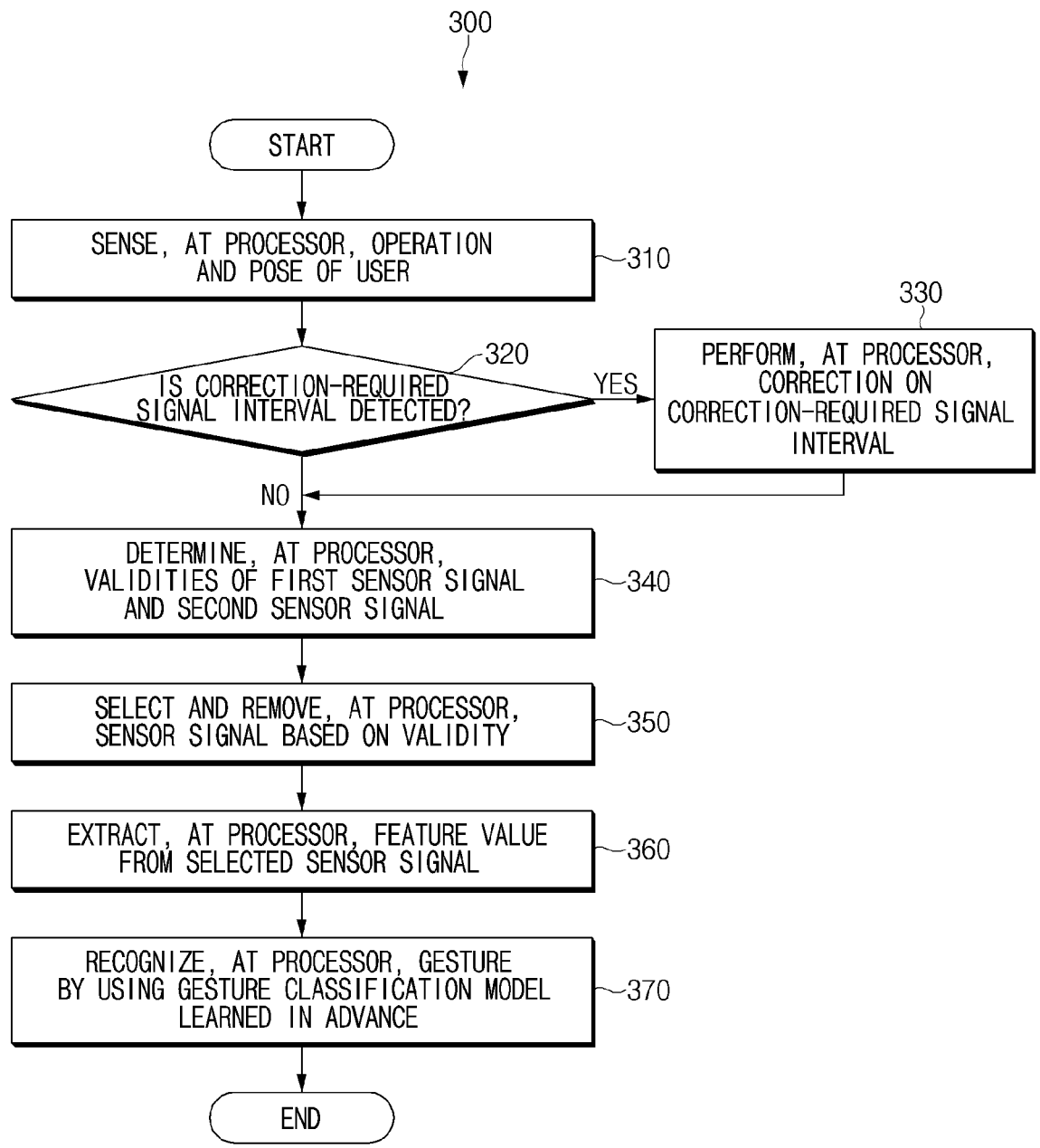
FIG. 3 is a diagram illustrating a method in which an electronic device according to an embodiment corrects a sensor signal to recognize a gesture of a user.

FIG. 3 is a diagram illustrating a method 300 in which an electronic device according to an embodiment corrects a sensor signal to recognize a gesture of a user.

Referring to FIG. 3, according to an embodiment, in operation 310, the processor 120 can recognize a pose of the user (e.g., a position of the user's arm, a state where the user lies, and a state where the user is seated) by using the first sensor signal sensed by the first sensor 111 and the second sensor signal sensed by the second sensor 112. For example, in the case where the second sensor signal is a PPG signal, the processor 120 can sense a pose of the user (e.g., where the user's arm making a gesture is positioned on the basis of the heart) in consideration of a signal flip in the PPG signal. Here the signal flip may mean a shape where, during a unit time, the amplitude of a signal increases to a specific value or more or decreases to the specific value or less. In various embodiments, the processor 120 can correct a signal interval requiring correction, depending on a movement state of the user (e.g., the case where the user is in a stop state, the case where the user walks, and the case where the user runs). In various embodiments, the electronic device 10 can segment only a signal interval including a gesture signal, which is generated based on a gesture operation of the user, with regard to the first sensor signal and the second sensor signal and can perform correction for the pose of the user on the segmented signal interval.

According to an embodiment, in operation 320, the processor 120 can detect a signal interval requiring correction with regard to each of the first sensor signal and the second sensor signal by using the pose of the user sensed in operation 310 and can determine whether correction is necessary, depending on whether the signal interval requiring correction is detected. For example, in the case where at least one of the first sensor signal and the second sensor signal includes a PPG signal of the user and the electronic device 10 is a wearable device mounted on the user's wrist, a phenomenon where the same waveform is flipped at the PPG signal depending on a relative position of an arm and a heart of the user may occur. For example, even though the user makes the same gesture, in the case where a position of the user's arm making a gesture is placed above the user's heart, the same waveform may be frequently flipped. In this case, the processor 120 can detect an interval acting as a factor to obstruct gesture recognition as a correction-required signal interval (e.g., the interval in which multiple flips occur) from the PPG signal of the user sensed by the PPG sensor. The processor 120 can determine whether to correct the detected signal interval requiring correction.

According to an embodiment, when it is determined in operation 320 that there is a signal interval requiring correction (YES), in operation 330, the processor 120 can perform correction on the signal interval requiring correction.

In various embodiments, the processor 120 can exclude correction-required signal intervals included in the first sensor signal and the second sensor signal from a gesture recognition target.

In various embodiments, the processor 120 can set a weight value for the correction-required signal intervals included in the first sensor signal and the second sensor signal to a reference or less, thus reducing the influence of a feature value on a gesture extracted in the correction-required signal intervals. For example, the processor 120 can set weight values for the correction-required signal intervals included in the first sensor signal and the second sensor signal to "0", thus removing the influence of a feature value on a gesture extracted in the correction-required signal intervals of the feature value.

In various embodiments, the processor 120 can rank a pose of the user sensed in operation 310, depending on the degree of a given pose. For example, the processor 120 can rank a pose of the user by using how frequently a signal flip occurs in the first sensor signal and the second sensor signal or the number of times that a signal flip occurs. The processor 120 can differently correct a signal interval requiring correction, depending on a rank of the user's pose. For example, in the case where a rank of the user's pose is higher than a reference rank (e.g., in the case where the number of times that a signal flip occurs is many), the processor 120 can exclude the corresponding sensor signal from a gesture recognition target.

According to an embodiment, in operation 340, the processor 120 can determine a validity of each of the first sensor signal and the second sensor signal with regard to gesture recognition. In an embodiment, the processor 120 can determine the validities of the first sensor signal and the second sensor signal, based on whether it is possible to recognize a gesture. For example, the processor 120 can determine whether it is possible to recognize a gesture, for example, whether it is possible to recognize a gesture by using the first sensor signal and the second sensor signal, by using at least one of a signal-to-noise ratio (SNR) of each of the first sensor signal and the second sensor signal, a result of analyzing patterns of the first sensor signal and the second sensor signal, and a result of comparing the first sensor signal and the second sensor signal. As such, the processor 120 can determine the validities of the first sensor signal and the second sensor signal. However, the disclosure is not limited thereto.

In various embodiments, the processor 120 can segment each of the first sensor signal and the second sensor signal and can determine validities of the segmented sensor signals independently of each other. For example, in the case where the first sensor signal includes an acceleration signal of the user, the processor 120 can segment the acceleration signal into x-axis, y-axis, and z-axis acceleration signals and can independently determine validities of the x-axis acceleration signal, the y-axis acceleration signal, and the z-axis acceleration signal.

According to an embodiment, in operation 350, the processor 120 can select or exclude a sensor signal depending on the validity of each sensor signal determined in operation 340. For example, the processor 120 can select a sensor signal, which is determined as valid for gesture recognition, from among the first sensor signal and the second sensor signal as a gesture recognition target. For example, the processor 120 can exclude a sensor signal, which is determined as invalid for gesture recognition, from among the first sensor signal and the second sensor signal from a gesture recognition target.

According to an embodiment, in operation 360, the processor 120 can extract a feature value (e.g., energy, correlation, entropy, Fast Fourier Transform coefficients, average, distribution, covariance, a maximum value, a minimum value, zero crossing point, time series data length, skewness, kurtosis, or an integral value of a sensor signal) for gesture recognition by using a sensor signal selected as a gesture recognition target in operation 350.

In various embodiments, in the case where the y-axis acceleration signal is excluded from a gesture recognition target as it is determined that the validity of the y-axis acceleration signal is less than a reference value, the processor 120 can extract a feature value for gesture recognition by using only the x-axis acceleration signal and z-axis acceleration signal of the acceleration signal.

In various embodiments, the processor 120 can select feature value lists respectively corresponding to the first sensor 111 and the second sensor 112 from among feature value lists stored in advance and can extract a feature value for recognizing a gesture of the user from the first sensor signal and the second sensor signal by using the selected feature value lists. For example, in the case where the second sensor 112 is the PPG sensor, the electronic device 10 can select a feature value list including a feature value for obtaining an FFT coefficient from the PPG signal sensed by the PPG sensor and can extract a feature value from the PPG signal by using the selected feature value list.

According to an embodiment, in operation 370, the processor 120 can recognize a gesture by using the feature value extracted in operation 360. For example, the processor 120 can input the feature value extracted in operation 360 to the gesture classification model loaded from the memory 150 and can recognize a gesture from the input feature value. In various embodiments, the processor 120 can recognize a gesture indicated by the feature value extracted in operation 360 by using the feature value extracted in operation 360 and the feature value list for each gesture (e.g., Table 1 below).

TABLE 1

| Gesture | FFT Max | Integral | Skewness | Min max ratio (max/min) |
|---|---|---|---|---|
| DROP | 1869 | 1.2429e+04 | −0.1691 | 22.6 |
| LIFT | 300 | 1.3002e+05 | 0.1837 | 0.06 |
| FLICK | 1.263e+05 | 1.4265e+07 | 0.3328 | 1.402 |

Referring to Table 1 above, the electronic device 10 can store a feature value list for each gesture as listed in Table 1 above. When a feature value is extracted in operation 360, the electronic device 10 can load the feature value list for each gesture, which is stored in advance in the memory 150, from the memory 150 and can select a gesture corresponding to the feature value extracted in operation 360 by using the loaded feature value list for each gesture. As such, the electronic device 10 can recognize the gesture. For example, when the feature value extracted in operation 360 is skewness and a skewness value is 1.3002e+05, the electronic device 10 can recognize that the feature value is a value indicating a DROP operation gesture.

Figure 4:
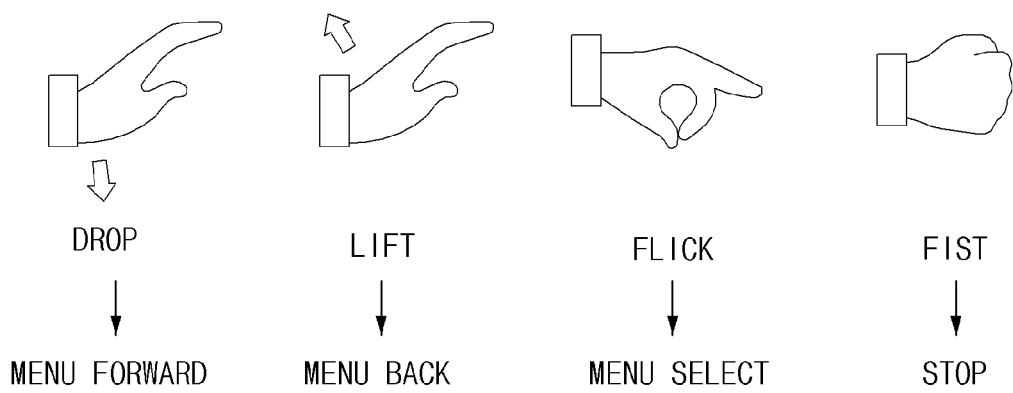
FIG. 4 is a diagram illustrating a gesture set for each function stored in advance in an electronic device according to various embodiments.
Figure 5:
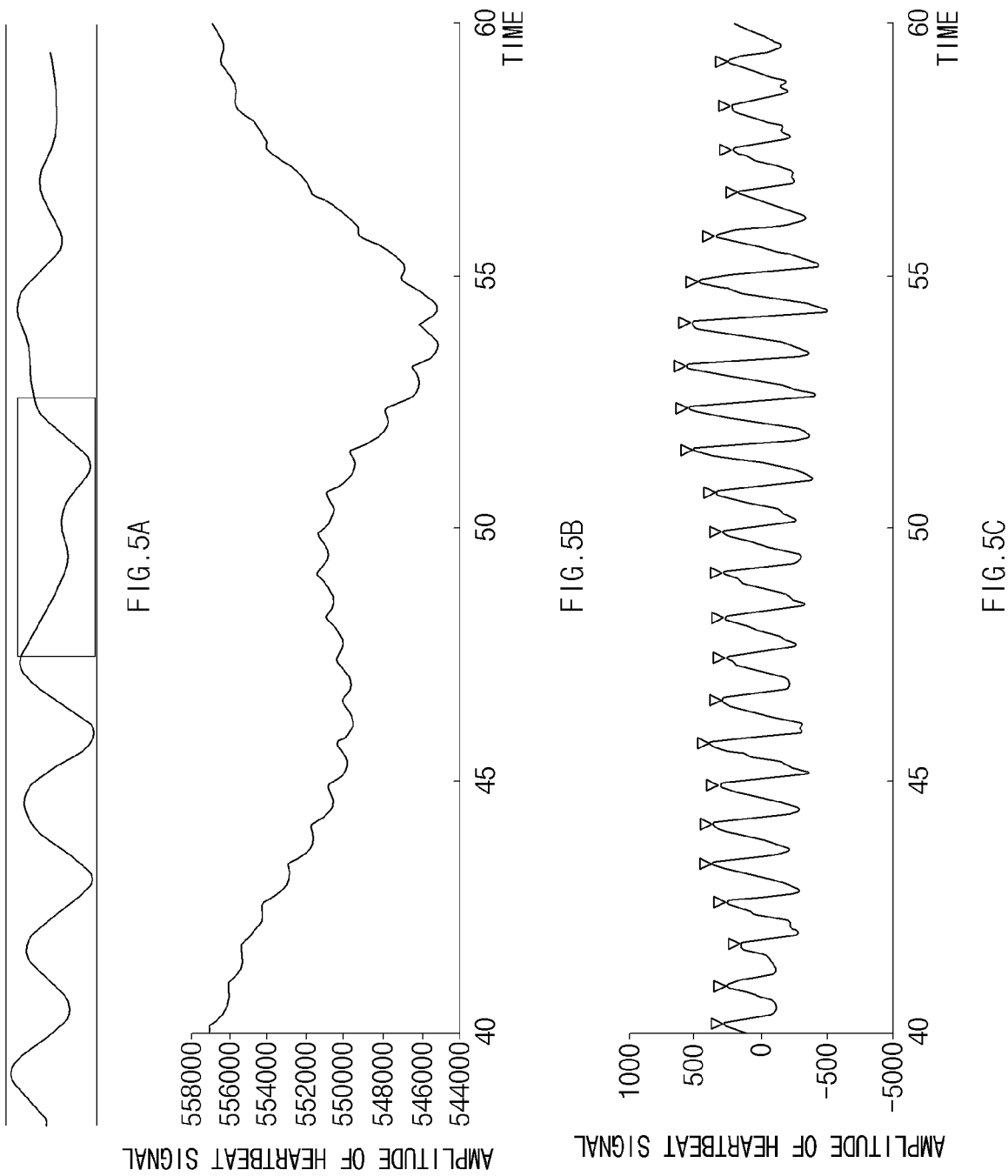
FIGS. 5A to 5C are diagrams illustrating a heartbeat signal of a user sensed by an electronic device according to various embodiments.

In various embodiments, the electronic device 10 can execute a function corresponding to the gesture recognized in operation 370 by using the gesture operation recognized in operation 370 and a gesture set for each function (e.g., FIG. 4) stored in advance, For example, referring to FIG. 4, the electronic device 10 can match a specific gesture with a function indicated by the specific gesture (e.g., matching a DROP operation with a menu forward function, a LIFT operation with a menu back function, a FLICK operation with a menu select function, and a FIST operation with a stop function) and can store the matched result as the gesture set for each function. When a gesture operation recognized by using the feature value extracted in operation 360 and the feature value list for each gesture stored in advance indicate a "DROP operation" gesture, the electronic device 10 can execute a "menu forward" operation indicated by the DROP operation gesture by using the gesture set for each function stored in advance. However, the above description is exemplary. For example, there may be no limitation on a gesture and function set according to various embodiments of the disclosure. For example, an electronic device 10 can enter a screen to execute a function for reading a received message when a first gesture is recognized and can enter a screen to execute a function for writing back when a second gesture is recognized. In this case, the electronic device 10 can activate a microphone (e.g., an input device 1550 of FIG. 15) capable of receiving a voice, can receive a user voice, can convert the received voice into a text, and can execute a function for generating a reply. The electronic device 10 can execute a function for sending the generated answer when a third gesture is recognized. For another example, when an application associated with an exercise is executed, the electronic device 10 can recognize a fourth gesture and can start an exercise tracking function.

In various embodiments, the gesture classification model may be the gesture classification model (e.g., a classifier of a deep learning model) that in advance learns information (e.g., the variations and a waveform of a sensor signal) about a plurality of sensor signals, which are generated as the user gestures, and gestures respectively corresponding to the plurality of sensor signals as learning data. However, the disclosure is not limited thereto.

In various embodiments, although not illustrated, in the case where the gesture classification model fails to extract a result value based on the feature value extracted in operation 360 (e.g., in the case where data are not learned by the gesture classification model), the processor 120 can control the gesture classification model to learn the input feature value and a gesture of the user corresponding to the feature value as new learning data. Here, in the case where the y-axis acceleration signal is excluded from a gesture recognition target as it is determined that the validity of the y-axis acceleration signal is less than the reference value, the processor 120 can generate new learning data by using only the x-axis acceleration signal and z-axis acceleration signal of the acceleration signal.

In various embodiments, in the case where the gesture classification model fails to draw a result value from the feature value (e.g., in the case where data are not learned by the gesture classification model), the processor 120 can output a guidance message indicating a gesture recognition fail through the display 140. In various embodiments, in the case of failing to recognize a gesture corresponding to a result value extracted in operation 370 (e.g., in the case where a gesture corresponding to the result value extracted in operation 370 is absent from the gesture set stored in advance), the processor 120 can output the guidance message indicating the gesture recognition fail through display 140.

Figure 6:
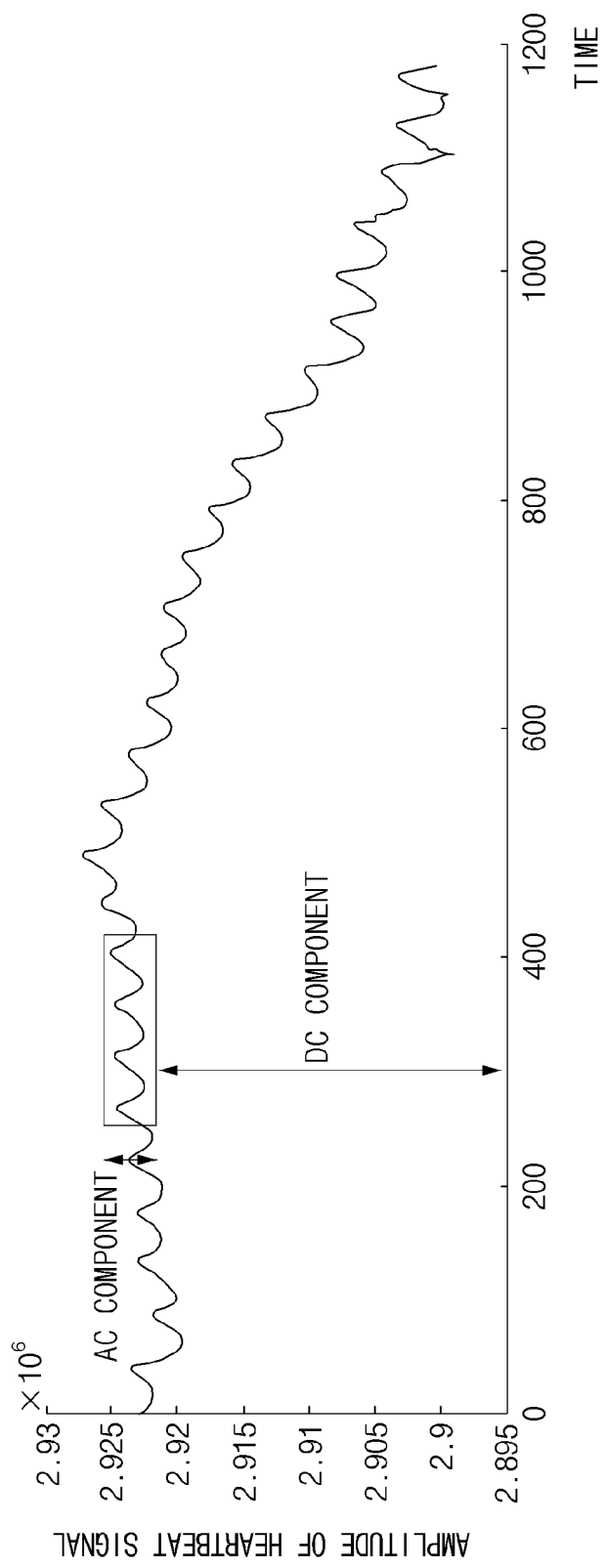
FIG. 6 is a diagram illustrating an offset change of a DC component of a heartbeat signal of a user sensed by an electronic device according to various embodiments over time.
Figure 7A:
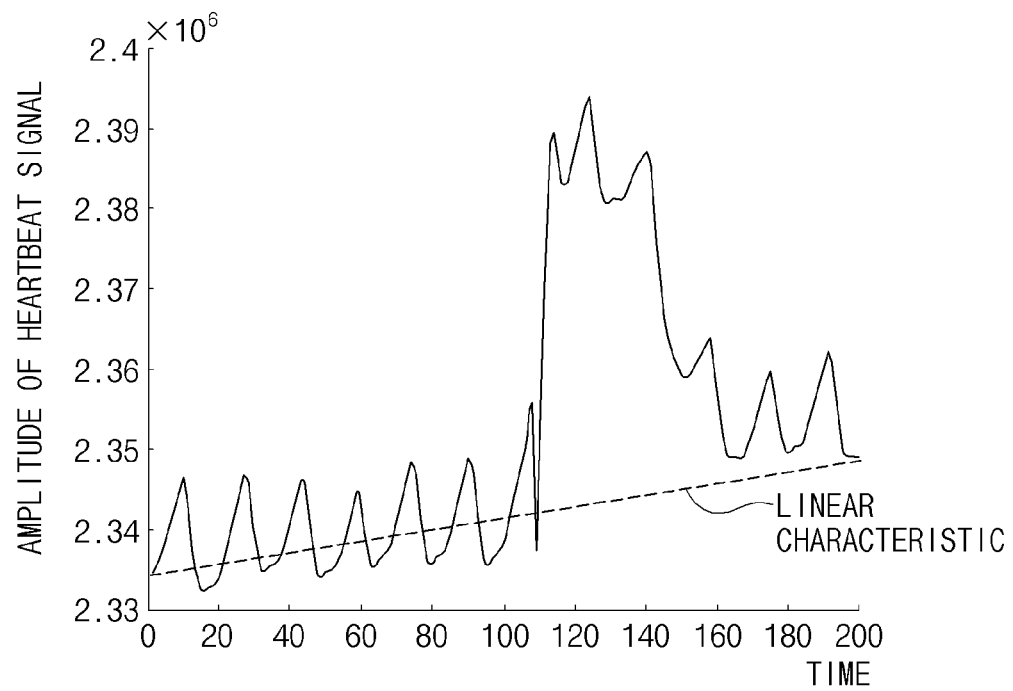
FIGS. 7A and 7B are diagrams illustrating a heartbeat signal of a user sensed by an electronic device according to various embodiments and a filtered heartbeat signal of the user.
Figure 7B:
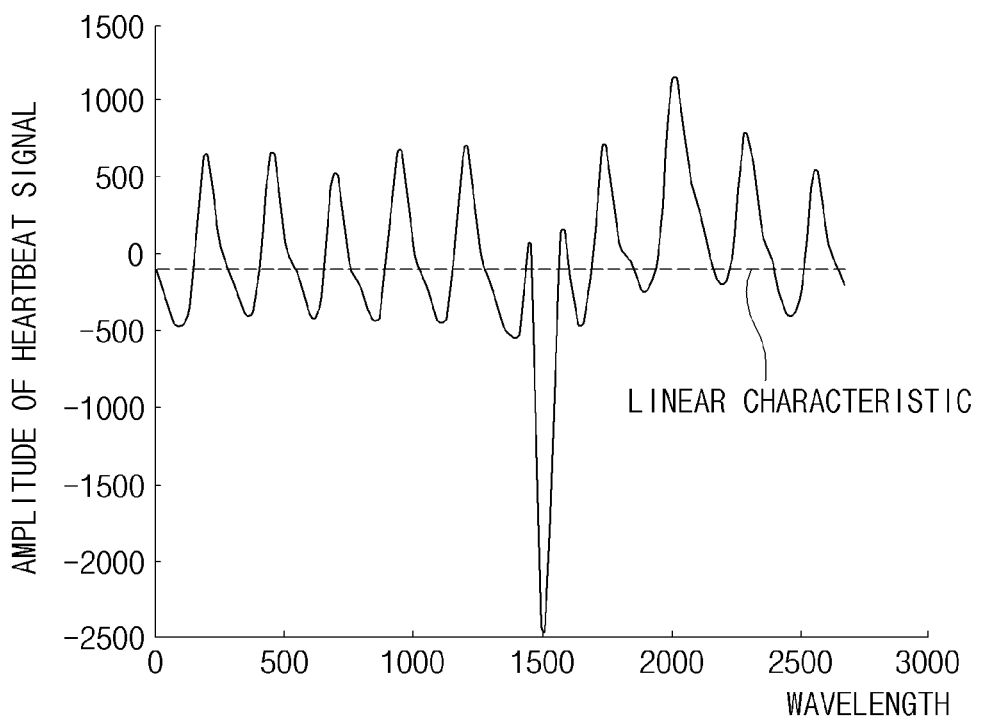

FIGS. 5A to 5C are diagrams illustrating a heartbeat signal of a user sensed by the electronic device 10 (e.g., the electronic device 10 of FIG. 1 or the electronic device 1501 of FIG. 15) according to various embodiments, FIG. 6 is a diagram illustrating an offset change of a DC component of a heartbeat signal of a user sensed by the electronic device 10 (e.g., the electronic device 10 of FIG. 1 or the electronic device 1501 of FIG. 15) according to various embodiments over time, and FIGS. 7A and 7B are diagrams illustrating a heartbeat signal of a user sensed by the electronic device 10 (e.g., the electronic device 10 of FIG. 1 or the electronic device 1501 of FIG. 15) according to various embodiments and a filtered heartbeat signal of the user.

Referring to FIGS. 5A to 7B, in an embodiment, the electronic device 10 can perform a pre-processing operation (e.g., operation 1010 of FIG. 10) on the first sensor signal sensed by the first sensor 111 (e.g., the first sensor 111 of FIG. 1) and the second sensor signal sensed by the second sensor 112 (e.g., the second sensor 112 of FIG. 1). For example, the second sensor 112 can be a PPG sensor, and the second sensor signal may be a PPG signal of the user sensed by the PPG sensor. The electronic device 10 can perform the pre-processing operation on the PPG signal to remove a noise signal from the PPG signal.

In an embodiment, from an interval (FIG. 5B) that belongs to a PPG signal (FIG. 5A) sensed through the PPG sensor and includes a gesture signal, it may be confirmed that the PPG signal includes a DC component, which is affected by a skin tone of the user, a location where the user wears the electronic device 10 (e.g., a relative position of a wrist and a heartbeat of the user in the case where the user mounts the electronic device 10 including the PPG sensor on his/her wrist), a wearing strength of the electronic device 10, a pose of the user, and the like, and an AC component sensed by a heartbeat of the user. Here, because the AC component indicating the pulsatile morphology of the heart significantly appears at the PPG signal rather than the DC component appearing by reflection or transmission, to recognize a gesture accurately, there may be used only the AC component of the PPG signal obtained by filtering the DC component of the PPG signal of FIG. 5B, as illustrated in FIG. 5C.

Referring to the variations in an offset of a PPG signal illustrated in FIG. 6, the AC component of the PPG signal varies relatively fast regularly over time, while the DC component of the PPG signal varies relatively slowly over time. For this reason, a gesture operation that is performed in a moment may fail to be recognized accurately. For example, the DC component of the PPG signal may be classified as a noise when the electronic device 10 classifies a feature of a gesture. Also, because the AC component indicating the pulsatile morphology of the heart significantly appears at the PPG signal rather than the DC component appearing by reflection or transmission, to recognize a gesture accurately, there may be used only the AC component of the PPG signal obtained by filtering the DC component of the PPG signal, as illustrated in FIG. 5C.

Accordingly, the electronic device 10 can filter the PPG signal through a pre-processing operation for a sensor signal and can remove the DC component indicating a linear characteristic of the PPG signal.

Referring to FIGS. 7A and 7B, in various embodiments, the electronic device 10 can filter a PPG signal by using at least one of a moving average filter and a band pass filter. For example, the electronic device 10 can filter a PPG signal illustrated in FIG. 7A by using the band pass filter and can remove a DC component indicating a linear characteristic from the PPG signal, like a PPG signal illustrated in FIG. 7B.

FIGS. 8A and 8B is a diagram illustrating an example in which one sensor signal generated according to the same gesture operation has different waveforms, at an electronic device (e.g., the electronic device 10 of FIG. 1 or the electronic device 1501 of FIG. 15) according to various embodiments.

In an embodiment, in an embodiment, the electronic device 10 can perform a validity evaluation operation (e.g., operation 250 of FIG. 2 or operation 1030 of FIG. 10) on the first sensor signal sensed by the first sensor 111 (e.g., the first sensor 111 of FIG. 1) and the second sensor signal sensed by the second sensor 112 (e.g., the second sensor 112 of FIG. 1).

Referring to FIGS. 8A and 8B, even though the user performs the same gestures, sensor signals having different waveforms may be sensed. For example, as illustrated in FIGS. 8A and 8B, even though the user performs the same gesture, a start point of a gesture signal interval detected from a PPG signal sensed from the user and a start point of a gesture signal interval detected from an acceleration signal sensed from the user may be different.

In an embodiment, as illustrated in FIG. 8A, in the case where an amplitude and the variations of a signal are clearly distinguishable in a heartbeat interval and a gesture signal interval of a PPG signal (e.g., an amplitude difference of signals in the heartbeat interval and the gesture interval is a threshold value or more or in the case where the variations in a waveform are a threshold value or more), the electronic device 10 can accurately recognize the gesture signal interval generated according to a gesture operation, which the user performs, within the PPG signal illustrated in FIG. 8A.

As illustrated in FIG. 8B, in the case where an amplitude and the variations of a signal are not clearly distinguishable in a heartbeat interval and a gesture signal interval of a PPG signal (e.g., an amplitude difference of signals in the heartbeat interval and the gesture interval is less than the threshold value or in the case where the variations in a waveform are less than the threshold value), the electronic device 10 may fail to accurately recognize the gesture signal interval generated according to a gesture operation, which the user performs, within the PPG signal illustrated in FIG. 8B. This means that the probability that an error occurs exists.

Accordingly, in the case of determining the validities of the first sensor signal and the second sensor signal, the electronic device 10 can clearly distinguish the gesture signal interval from an interval where a gesture signal is not included and can determine a signal (e.g., a signal of FIG. 8B or a signal where an amplitude difference of signals in the respective signal intervals is less than the threshold value or the variations in waveforms in the respective signal intervals are less than the threshold value) incapable of clearly recognizing a gesture of the user as an invalid signal.

Figure 9:
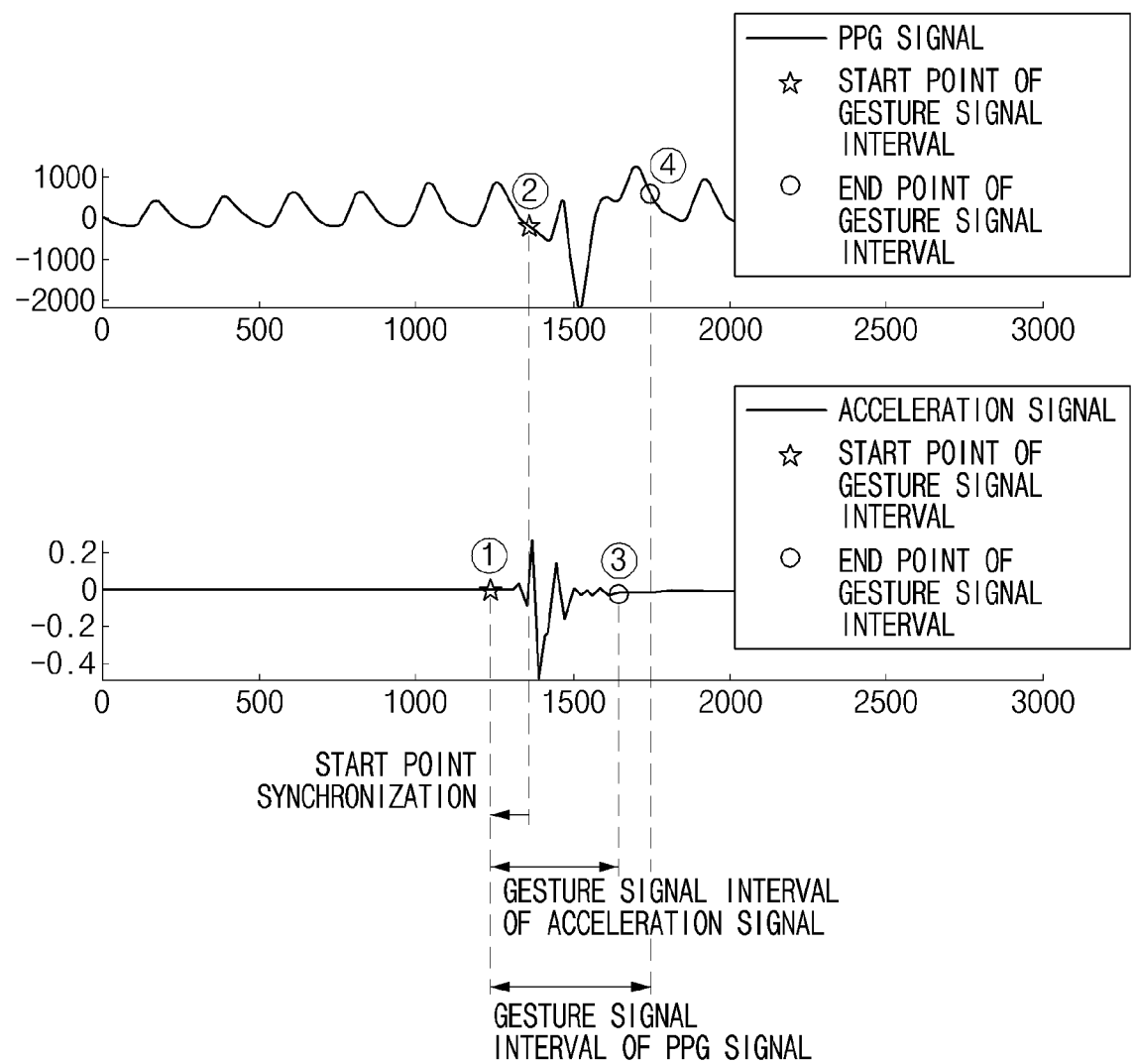
FIG. 9 is a diagram illustrating an example in which a plurality of sensor signals generated according to the same gesture operation have different gesture signal intervals, at an electronic device according to various embodiments.

FIG. 9 is a diagram illustrating an example in which a plurality of sensor signals generated according to the same gesture operation have different gesture signal intervals, at an electronic device according to various embodiments.

In an embodiment, in the case of setting a gesture signal interval for extracting a feature value corresponding to a gesture from each of the first sensor signal sensed by the first sensor 111 (e.g., the first sensor 111 of FIG. 1) and the second sensor signal sensed by the second sensor 112 (e.g., the second sensor 112 of FIG. 1), the electronic device 10 can identically set start points of the gesture signal intervals respectively included in the first sensor signal and the second sensor signal and can set end points of the gesture signal intervals independently of each other.

Referring to FIG. 9, the electronic device 10 can perform a signal segmentation operation (e.g., operation 1040 of FIG. 10) for segmenting gesture signal intervals from the first sensor signal and the second sensor signal. In this case, even though the user performs the same gesture operation, because gesture signal intervals respectively included in sensor signals sensed by the sensor unit 110 are different, the electronic device 10 can perform a gesture signal interval setting operation and a signal segmentation operation for each sensor signal.

For example, a start point, an end point, and a length of a gesture signal interval included in an acceleration signal sensed by an acceleration sensor included in the sensor unit 110 may be different from a start point, an end point, and a length of a gesture signal interval included in a PPG signal sensed by a PPG sensor included therein. For example, even though sensor signals generated as the user makes a gesture once are synchronized temporally, the start point ① of the gesture signal interval included in the acceleration signal may be different from the start point ② of the gesture signal interval included in the PPG signal. Also, the end point ③ of the gesture signal interval included in the acceleration signal may be different from the end point ④ of the gesture signal interval included in the PPG signal. As such, lengths of the gesture signal intervals respectively included in the sensor signals may be different.

In an embodiment, when extracting a pose of the user, an electronic device can detect a signal interval requiring associated correction and can additionally perform correction. For example, when extracting a pose of the user, the electronic device can estimate a relative position of an arm and a heart of the user and can perform correction in consideration of the relative position.

In an embodiment, the electronic device 10 can set a gesture signal interval of each sensor signal and can temporally synchronize the first sensor signal and the second sensor signal in a manner that start points of gesture signal intervals respectively included in the first sensor signal and the second sensor signal are identical. For example, the electronic device 10 can synchronize start points of gesture signal intervals respectively included in sensor signals, based on the start point ① of the gesture signal interval included in the acceleration signal, which is recognized relatively early, from among the start point ① of the gesture signal interval included in the acceleration signal and the start point ② of the gesture signal interval included in the PPG signal.

Also, the electronic device 10 can independently set the end point ③ of the gesture signal interval included in the acceleration signal and the end point ④ of the gesture signal interval included in the PPG signal. As such, the electronic device 10 can set the gesture signal interval included in the acceleration signal to an interval from ① to ③ and can set the gesture signal interval included in the PPG signal to an interval from ① to ④. In various embodiments, for each of sensor signals (e.g., a PPG signal and an acceleration signal), the electronic device 10 can perform a gesture signal interval setting operation (e.g., an operation for setting a start point and an end point of a gesture signal interval) and a signal segmentation operation.

In various embodiments, the electronic device 10 can perform signal segmentation in a manner that a gesture signal interval is included in each of the first sensor signal and the second sensor signal. In this case, to distinguish an interval including a gesture signal from an interval not including a gesture signal, the electronic device 10 can insert a gesture interval start signal indicating a gesture signal interval in front of the segmented gesture signal interval.

Figure 10:
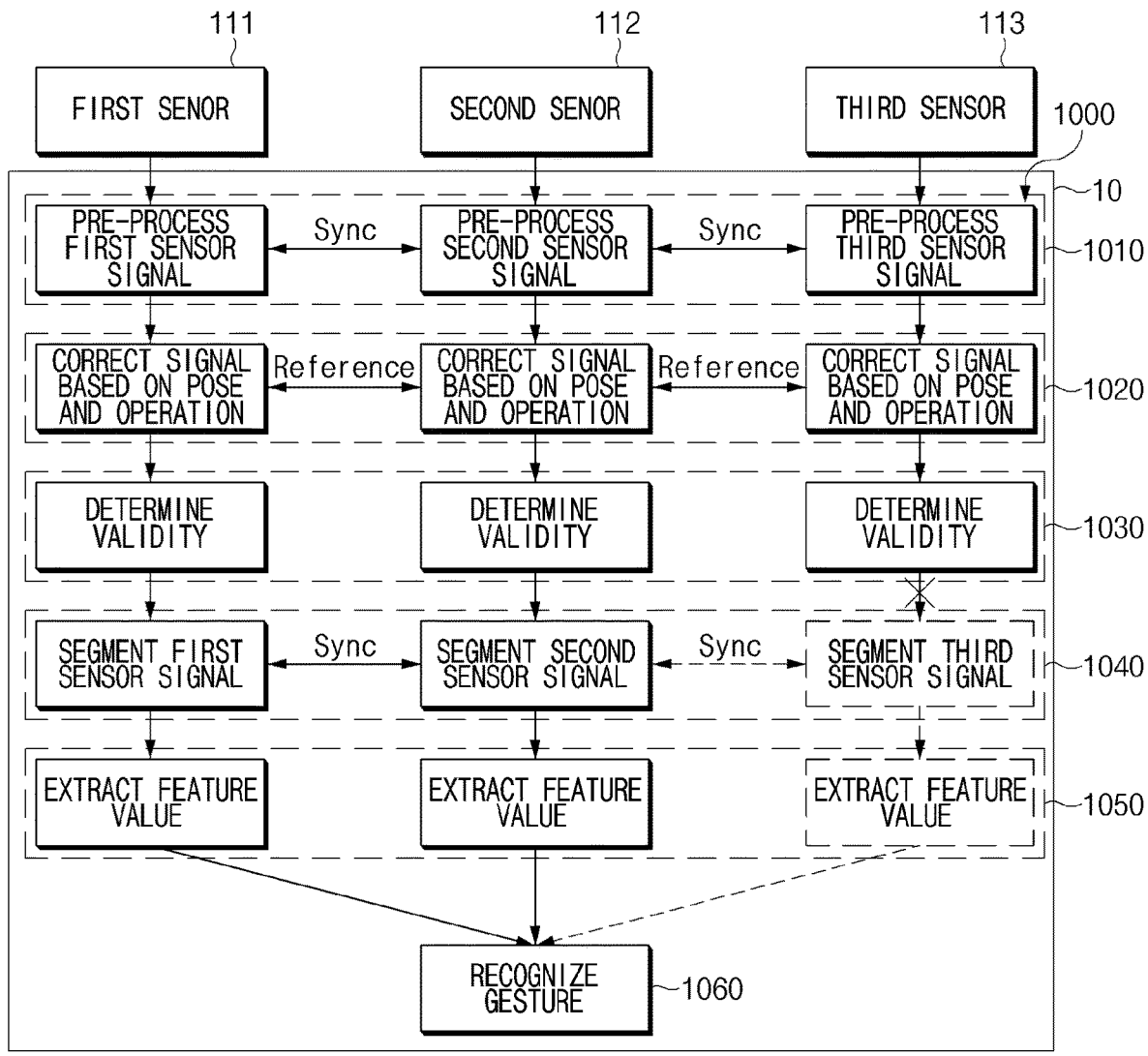
FIG. 10 is a diagram illustrating an operation in which an electronic device according to an embodiment recognizes a gesture of a user by using a plurality of sensor signals.

FIG. 10 is a diagram 1000 illustrating an operation 1000 in which the electronic device 10 (e.g., the electronic device 10 of FIG. 1 or the electronic device 1501 of FIG. 15) according to an embodiment recognizes a gesture of a user by using a plurality of sensor signals.

Referring to FIG. 10, in operation 1010, the electronic device 10 can perform pre-processing operations (e.g., a PPG signal pre-processing operation of FIGS. 5A to 7B) on the first sensor signal, the second sensor signal, and a third sensor signal sensed by the first sensor 111, the second sensor 112, and a third sensor 113, respectively. In this case, the electronic device 10 can synchronize the first sensor signal, the second sensor signal, and a third sensor signal temporally. In various embodiments, in operation 1010, the electronic device 10 can respectively perform the pre-processing operations on the first sensor signal, the second sensor signal, and the third sensor signal so as to segment only a signal interval including a gesture signal generated according to a gesture operation of the user.

In various embodiments, the electronic device 10 can synchronize the first sensor signal, the second sensor signal, and the third sensor signal temporally by matching start points of gesture signal intervals respectively included in the first sensor signal, the second sensor signal, and the third sensor signal. In various embodiments, the electronic device 10 can synchronize the first sensor signal, the second sensor signal, and the third sensor signal temporally by matching a time when the first sensor 111 senses the first sensor signal from the user, a time when the second sensor 112 senses the second sensor signal from the user, and a time when the third sensor 113 senses the third sensor signal from the user.

In various embodiments, in operation 1020, the electronic device 10 can sense a pose of the user (e.g., a position of the user's arm, a state where the user lies, and a state where the user is seated) by using the first sensor signal, the second sensor signal, and the third sensor signal and can perform a signal correction operation for correcting a signal depending on the sensed pose of the user. In this case, with reference to correction-required signal intervals respectively detected from the first sensor signal, the second sensor signal, and the third sensor signal (e.g., by comparing the correction-required signal intervals respectively included in the first sensor signal, the second sensor signal, and the third sensor signal), the electronic device 10 can perform correction on the correction-required signal intervals. For example, the electronic device 10 can remove the correction-required signal intervals respectively included in the first sensor signal, the second sensor signal, and the third sensor signal. In various embodiments, the electronic device 10 can correct a correction-required signal interval depending on a movement state of the user (e.g., the case where the user is in a stop state, the case where the user walks, and the case where the user runs).

In various embodiments, in operation 1030, the electronic device 10 can perform validity determination operations (e.g., operation 350 and operation 360 of FIG. 3) on the first sensor signal, the second sensor signal, and the third sensor signal, respectively. In various embodiments, the electronic device 10 can determine whether it is possible to recognize a gesture from the first sensor signal, the second sensor signal, and the third sensor signal by using at least one of a signal-to-noise ratio (SNR), a result of analyzing patterns of the sensor signals, and a result of comparing the sensor signals and can determine validities of the first sensor signal, the second sensor signal, and the third sensor signal based on whether it is possible to recognize a gesture. For example, when an SNR value of a sensor signal is less than a given value, the electronic device 10 can determine that it is impossible to recognize a gesture from the sensor signal. Alternatively, when a pattern of a sensor signal is irregular or the sensor signal has a given pattern, the electronic device 10 can determine that it is impossible to recognize a gesture from the sensor signal.

For example, in the case where the third sensor signal is determined as invalid for gesture recognition, the electronic device 10 can exclude the third sensor signal from a gesture recognition target, may select only the first sensor signal and the second sensor signal as a gesture recognition target, and can perform a gesture recognition operation by using only the selected gesture recognition targets (e.g., a signal determined as valid for gesture recognition).

In various embodiments, in operation 1040, the electronic device 10 can set gesture signal intervals respectively included in the first sensor signal, the second sensor signal, and the third sensor signal and can perform a signal segmentation operation for segmenting the first sensor signal, the second sensor signal, and the third sensor signal depending on the set gesture signal intervals. In this case, the electronic device 10 can identically set start points of the gesture signal intervals by using the first sensor signal, the second sensor signal, and the third sensor signal. In various embodiments, in a state of excluding a signal (e.g., the third sensor signal) determined as invalid for gesture recognition, the electronic device 10 can perform the signal segmentation operation only on signals (e.g., the first sensor signal and the second sensor signal) valid for gesture recognition.

In various embodiments, in operation 1050, the electronic device 10 can extract feature values indicating a gesture from the first sensor signal and the second sensor signal. The electronic device 10 can extract the feature values by using only sensor signals (e.g., the first sensor signal and the second sensor signal) segmented in operation 1040. For example, when the third sensor signal is determined as invalid, the electronic device 10 may not synchronize the third sensor signal with the second sensor signal in operation 1040 where the sensor signals are synchronized or may not extract a feature value from the third sensor signal.

In various embodiments, operation 1060, the electronic device 10 can recognize the gesture of the user by using the feature values extracted in operation 1050 (e.g., operation 370 of FIG. 3).

Figure 11:
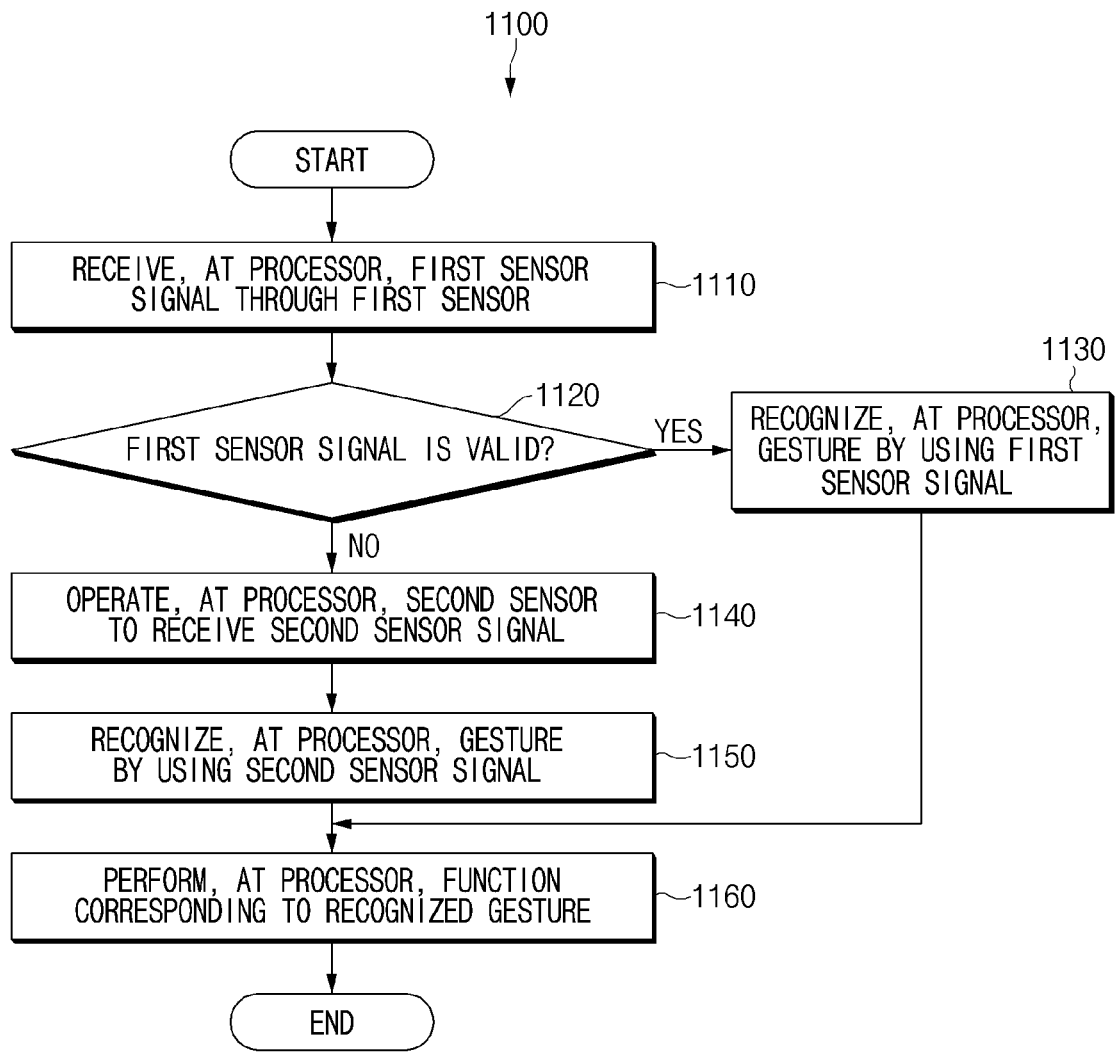
FIG. 11 is a flowchart of a method in which an electronic device according to an embodiment operates a plurality of sensors.

FIG. 11 is a flowchart of a method 1100 in which an electronic device according to an embodiment operates a plurality of sensors.

In an embodiment, in the case where the electronic device 10 is a wearable device capable of being mounted on a part of the user's body, because a size of the wearable device is generally small, a battery for operating the wearable device can be small in size and capacity. Accordingly, the electronic device 10 according to an embodiment can reduce current consumption through a way to always operate a sensor (e.g., an acceleration sensor) that does not consume a lot of power usually and operate the remaining sensors (e.g., a PPG sensor, a geomagnetic sensor, and a gyro sensor) if necessary.

Referring to FIG. 11, in an embodiment, in operation 1110, the processor 120 can operate only the first sensor 111 and can receive the first sensor signal sensed from the user. For example, the first sensor 111 can be an acceleration sensor, and the processor 120 can operate the acceleration sensor to receive an acceleration signal.

In an embodiment, in operation 1120, the processor 120 can determine the validity of the first sensor signal. For example, the processor 120 can recognize a gesture of the user by using the first sensor signal; when a gesture to be recognized does not exist, the processor 120 can determine that the first sensor signal is not valid.

In an embodiment, in operation 1130, when it is determined in operation 1120 that the first sensor signal is determined as valid (YES), the processor 120 can recognize a gesture of the user by using only the first sensor signal.

In an embodiment, in operation 1140, when it is determined in operation 1120 that the first sensor signal is determined as invalid (NO), the processor 120 can operate the second sensor 112 (e.g., a PPG sensor) to receive the second sensor signal.

In various embodiments, although not illustrated, the processor 120 can determine the validity of the second sensor signal, and the processor 120 can further include an operation for operating the third sensor 113 when the second sensor signal is determined as invalid.

In an embodiment, in operation 1150, the processor 120 can recognize the gesture of the user by using the second sensor signal.

In various embodiments, although not illustrated, even though the first sensor signal is determined as valid, in the case where a given condition is satisfied (e.g., in the case where a screen of the display 140 is changed to an on state), the processor 120 can recognize a gesture of the user by using the first sensor signal and the second sensor signal at the same time.

In an embodiment, in operation 1160, the processor 120 can control each component included in the electronic device 10 in a manner that a function corresponding to the gesture of the user recognized in operation 1150 is executed.

Figure 12:
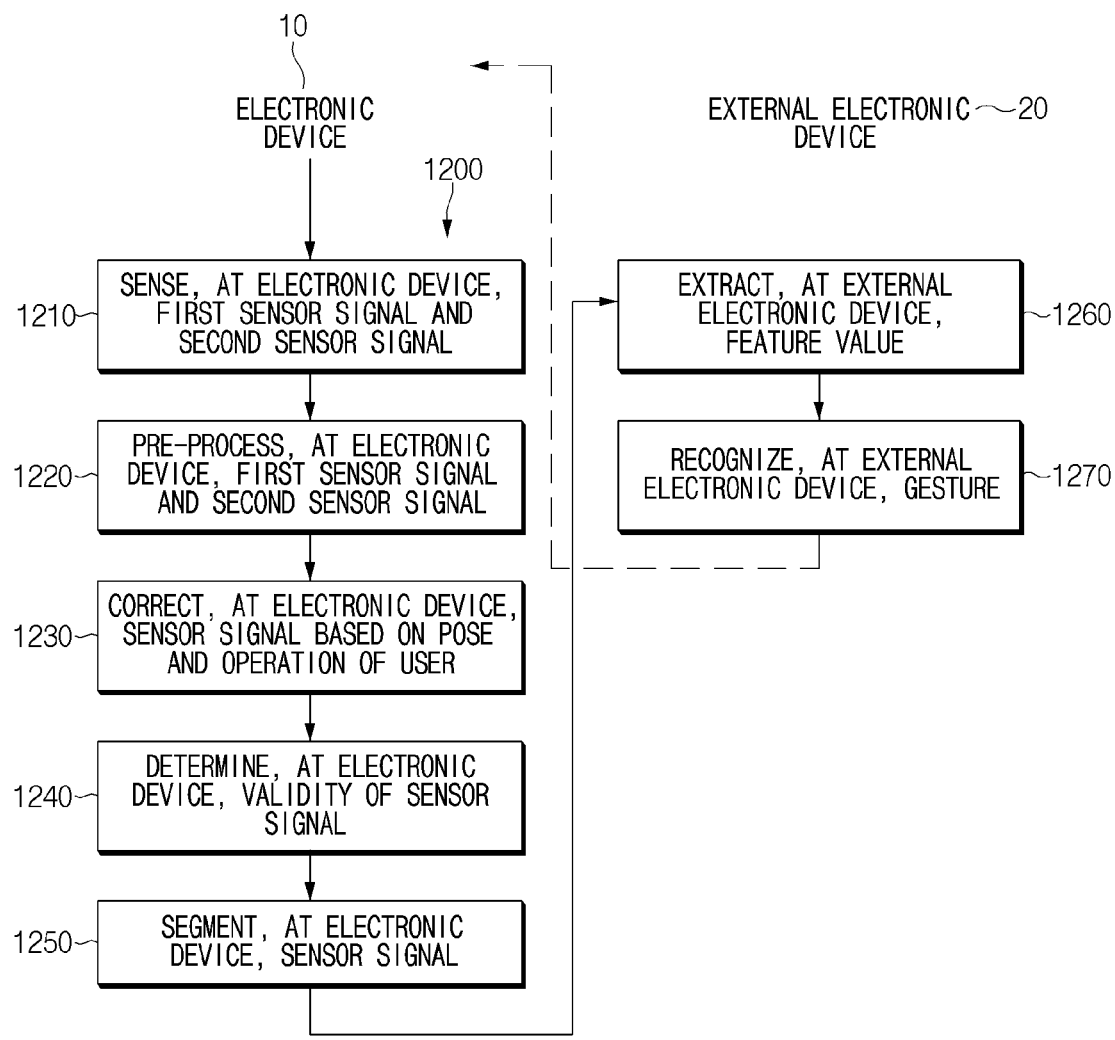
FIG. 12 is a diagram illustrating an operation in which an electronic device according to an embodiment is paired with an external electronic device to perform gesture recognition.

FIG. 12 is a diagram illustrating an operation 1200 in which the electronic device 10 (e.g., the electronic device 10 of FIG. 1 or the electronic device 1501 of FIG. 15) according to an embodiment is paired with the external electronic device 20 (e.g., the external electronic device 20 of FIG. 1) to perform gesture recognition.

Referring to FIG. 12, in an embodiment, the electronic device 10 can be paired with at least one external electronic device 20. For example, the electronic device 10 can set an operation state to at least one of a stand-alone mode and a pairing mode and can be paired with at least one external electronic device 20 when the operation state is set to the pairing state.

Also, the processor 120 of the electronic device 10 can perform at least one of operations for recognizing a gesture of the user by using the at least one external electronic device 20.

In various embodiments, the electronic device 10 can be paired with the external electronic device 20 through the processor 120 as illustrated in FIG. 12. To recognize a gesture of the user, the processor 120 can perform an operation 1210 (e.g., operation 210 of FIG. 2) of sensing the first sensor signal and the second sensor signal, an operation 1220 (e.g., operation 1010 of FIG. 10) of pre-processing the first sensor signal and the second sensor signal, an operation 1230 (e.g., operation 1020 of FIG. 10) of correcting a sensor signal based on a pose of the user, an operation 1240 (e.g., operation 1030 of FIG. 10) of determining the validity of the sensor signal and selecting a gesture recognition target, and an operation (e.g., operation 1040 of FIG. 10) of segmenting the sensor signal.

Also, to recognize the gesture of the user, the processor 120 of the electronic device 10 can transmit a control signal to the external electronic device 20 in a manner that the external electronic device 20 extracts feature values from the segmented signals after operation 1250 (operation 1260) (e.g., operation 1050 of FIG. 10) and recognizes the gesture by using the feature values (operation 1270) (e.g., operation 1060 of FIG. 10). In various embodiments, the communication unit 130 of the electronic device 10 can perform wired/wireless communication with a communication unit 170 of the external electronic device 20, and the electronic device 10 can transmit the control signal to the communication unit 170 of the external electronic device 20 through the communication unit 130.

In various embodiments, in the case where a function corresponding to the gesture recognized by the external electronic device 20 indicates the execution of a specific function of the external electronic device 20, a processor 160 of the external electronic device 20 can control each component in the external electronic device 20 so as to perform the specific function. In various embodiments, in the case where a function corresponding to the gesture recognized by the external electronic device 20 indicates the execution of a specific function of the electronic device 10, the external electronic device 20 can transmit a control signal to the processor 120 of the electronic device 10 in a manner that the processor 120 controls each component in the electronic device 10.

Figure 13:
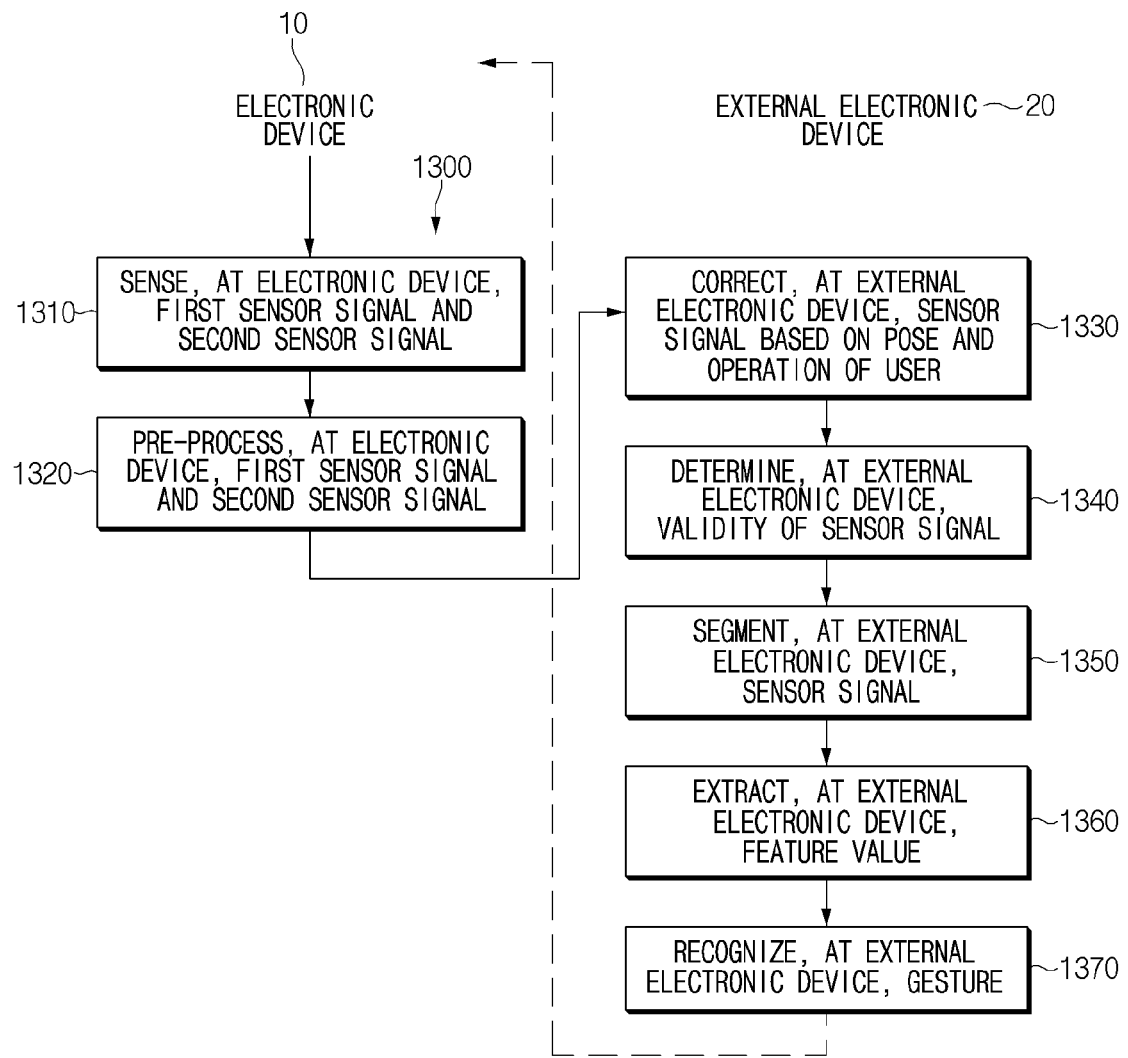
FIG. 13 is a diagram illustrating an operation in which an electronic device according to another embodiment is paired with an external electronic device to perform gesture recognition.

FIG. 13 is a diagram illustrating an operation 1300 in which an electronic device (e.g., the electronic device 10 of FIG. 1 or the electronic device 1501 of FIG. 15) according to another embodiment is paired with the external electronic device 20 (e.g., the external electronic device 20 of FIG. 1) to perform gesture recognition.

Referring to FIG. 13, in various embodiments, the electronic device 10 can be paired with the external electronic device 20 as illustrated in FIG. 13; to recognize a gesture of the user, the processor 120 can perform operation 1310 (e.g., operation 210 of FIG. 2) of sensing the first sensor signal and the second sensor signal and operation 1320 (e.g., operation 1010 of FIG. 10) of pre-processing the first sensor signal and the second sensor signal.

Also, to recognize the gesture of the user after operation 1320, the processor 120 of the electronic device 10 can transmit a control signal to the external electronic device 20 in a manner that the external electronic device 20 corrects sensor signals based on a pose of the user (operation 1330) (e.g., operation 1020 of FIG. 10), determines validities of the sensor signals and selects a gesture recognition target (operation 1340) (e.g., operation 1030 of FIG. 10), segments the sensor signals (operation 1350) (e.g., operation 1040 of FIG. 10), extracts feature values from the segmented signals (operation 1360) (e.g., operation 1050 of FIG. 10), and recognizes the gesture by using the feature values (operation 1370) (e.g., 1060 of FIG. 10). In various embodiments, the communication unit 130 of the electronic device 10 can perform wired/wireless communication with a communication unit 170 of the external electronic device 20, and the electronic device 10 can transmit the control signal to the communication unit 170 of the external electronic device 20 through the communication unit 130.

In various embodiments, in the case where a function corresponding to the gesture recognized by the external electronic device 20 indicates the execution of a specific function of the external electronic device 20, the processor 160 of the external electronic device 20 can control each component in the external electronic device 20 so as to perform the specific function. In various embodiments, in the case where a function corresponding to the gesture recognized by the external electronic device 20 indicates the execution of a specific function of the electronic device 10, the external electronic device 20 can transmit a control signal to the processor 120 of the electronic device 10 in a manner that the processor 120 controls each component in the electronic device 10.

In an embodiment, as at least a part of operations for gesture recognition performed by the electronic device 10 is distributed into the external electronic device 20 paired therewith, the amount of computation of the electronic device 10 can decrease, and thus, a battery power may be saved. Also, as a part of the operations for gesture recognition is performed by using the external electronic device 20 having a relatively high performance compared to the electronic device 10, a speed at which the electronic device 10 recognizes a gesture and performs a function corresponding to the recognized gesture can be improved.

In various embodiments, the electronic device 10 can determine kinds and the number of operations for recognizing a gesture of the user, which are performed through the external electronic device 20, by using at least one of the number of sensors used to recognize a gesture of the user, the amount of computation to be processed within the electronic device 10, and the amount of computation to be processed within the external electronic device 20.

Figure 14:
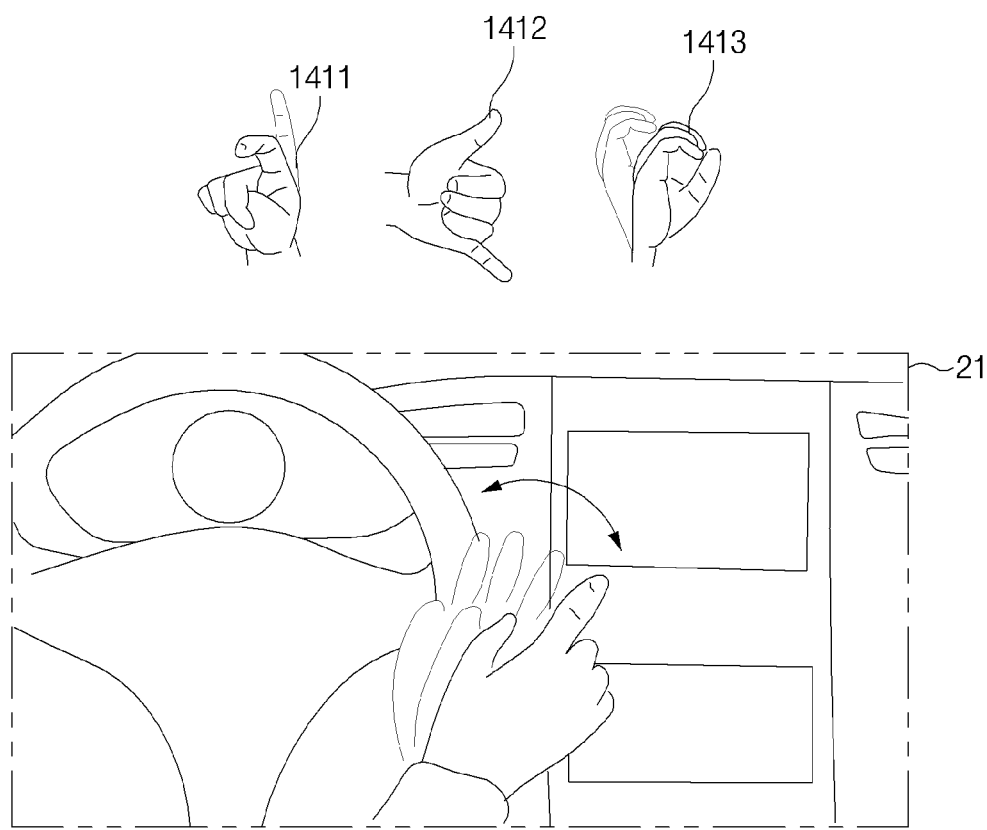
FIG. 14 is a diagram illustrating a gesture set loaded when an electronic device is paired with an in-vehicle infotainment system, in various embodiments.

FIG. 14 is a diagram illustrating a gesture set loaded when the electronic device 10 (e.g., the electronic device 10 of FIG. 1 or the electronic device 1501 of FIG. 15) is paired with an in-vehicle infotainment system 21, in various embodiments.

In various embodiments, the electronic device 10 can be paired with the external electronic device 20 and can set a gesture set for recognizing a gesture of the user depending on a kind of the external electronic device 20 paired. For example, the electronic device 10 can set a gesture set corresponding to functions executable at the external electronic device 20 to a gesture set for recognizing a gesture of the user, depending on a kind of the external electronic device 20 paired. In another embodiment, a gesture set corresponding to functions executable at the external electronic device 20 can be stored in a memory of the external electronic device 20.

Referring to FIG. 14, in the case where the external electronic device 20 paired with the electronic device 10 is determined as the in-vehicle infotainment system 21 (e.g., in the case where a name set to the external electronic device 20 paired with the electronic device 10 is a vehicle name or android auto), the electronic device 10 can set a gesture set including at least one of gestures performed in a state of being paired with the in-vehicle infotainment system 21 to a gesture set for recognizing a gesture, depending on a gesture associated with a vehicle control and a gesture execution history stored in advance. For example, in the case where the external electronic device 20 paired with the electronic device 10 is determined as the in-vehicle infotainment system 21, the electronic device 10 can set a gesture set including a first gesture 1411 (e.g., a gesture of folding and unfolding an index finger) indicating the execution of a function to play a next music, a second gesture 1412 (e.g., a gesture of unfolding only a thumb and a little finger) indicating the execution of a function to maintain a call, and a third gesture 1413 (e.g., a gesture of folding all fingers) indicating the execution of a function associated with a location selection operation, to a gesture set for recognizing a gesture. However, the above description is exemplary, and there may be no limitation on a gesture and function set.

In various embodiments, in the case where the external electronic device 20 paired with the electronic device 10 is the in-vehicle infotainment system 21 and an acceleration signal sensed from the user in a state of being paired with the in-vehicle infotainment system 21 is determined as irregular, the acceleration signal can be excluded from a gesture recognition target. For example, in the case where the variations in an acceleration signal due to acceleration of a vehicle stably changes within a specific amplitude value (e.g., in the case where the variations in an acceleration signal are a threshold value or less), the electronic device 10 can determine that a signal in which a value of the acceleration signal is the threshold value or more is valid. Also, in the case where the variations in the acceleration signal due to the acceleration of the vehicle are irregular or the number of times that the variations in the acceleration signal exceed a threshold value stored in advance exceeds the given number of times, the electronic device 10 can determine that the acceleration signal is invalid. In this case, the electronic device 10 can control an operation state of an acceleration sensor sensing the acceleration signal of the user to an off state and can operate any other sensor (e.g., a PPG sensor) for sensing a gesture of the user other than the acceleration signal.

In various embodiments, in the case where the acceleration signal is determined as invalid in a state where the electronic device 10 is paired with the in-vehicle infotainment system 21, the electronic device 10 can change the operation state of the acceleration sensor to an off state; in the case where the user maintains a driving state (e.g., in the case where a movement of operating, by the user, components in the vehicle is detected based on a sensor signal (e.g., a gyro signal) sensed from the user or in the case where the acceleration signal has an amplitude value of a threshold value or more in a specific direction), the electronic device 10 can maintain the operation state of the acceleration sensor in the off state until a state of the user is changed from the driving state to a stop state. In this case, the electronic device 10 can maintain the operation state of the whole sensor unit 110 including the acceleration sensor in the off state. However, the disclosure is not limited thereto.

In various embodiments, in the case where the acceleration signal is determined as invalid in a state of being paired with the in-vehicle infotainment system 21, the electronic device 10 can change the operation state of the acceleration sensor to the off state; in the case where the user maintains a currently moving state (e.g., in the case where a location of the user sensed by using a GPS sensor and a change of a base station cell identifier Cell-ID are continuously changed), the electronic device 10 can maintain the operation state of the acceleration sensor in the off state until a state of the user is changed to a stop state.

In various embodiments, under the condition that the external electronic device 20 paired with the electronic device 10 is the in-vehicle infotainment system 21, when a specific axis value of an acceleration signal (e.g., an y-axis value of the acceleration signal) varies irregularly while the user turns a handle being a steering device of a vehicle, the electronic device 10 can exclude the y-axis value of the acceleration signal from a gesture recognition target.

In various embodiments, in the case where the external electronic device 20 paired with the electronic device 10 is a smartphone, the electronic device 10 can set a gesture set corresponding to functions executable at the electronic device 10 to a gesture set for recognizing a gesture of the user. For example, when the electronic device 10 recognizes a fourth gesture (e.g., an operation of vertically moving a finger), the electronic device 10 can vertically scroll a screen of the external electronic device 20 (e.g., a smartphone). Alternatively, when the electronic device 10 recognizes a fifth gesture (e.g., an operation of performing simultaneous selection with two fingers), the external electronic device 20 (e.g., a smartphone) can execute a function to quickly respond to a message being currently displayed.

In various embodiments, in the case where the external electronic device 20 paired with the electronic device 10 performs a camera function, the electronic device 10 can execute a photographing and recording function based on a gesture recognized by the electronic device 10. For example, when the electronic device 10 recognizes a sixth gesture (e.g., an operation of performing simultaneous selection with two fingers), the external electronic device 20 (e.g., a smartphone) that is performing the camera function can start photographing or recording. When the electronic device 10 recognizes a seventh gesture (e.g., an operation of closing a fist), the external electronic device 20 can end the photographing or recording. Alternatively, when the electronic device 10 recognizes an eighth gesture (e.g., an operation of moving side to side with only two fingers unfolded), the external electronic device 20 can change a field of view.

In various embodiments, the electronic device 10 can set a gesture set for recognizing a gesture of the user by using information about a location of the user sensed by the sensor unit 110. For example, in the case where a location of the user sensed by the sensor unit 110 indicates a house of the user, the electronic device 10 can set a gesture set including gestures performed at the house of the user or a gesture set including a gesture capable of controlling the external electronic device 20 paired with the electronic device 10 within the house of the user to a gesture set for recognizing a gesture of the user, depending on a gesture execution history stored in advance.

FIG. 15 is a block diagram illustrating an electronic device 1501 in a network environment 1500 according to various embodiments. Referring to FIG. 15, the electronic device 1501 in the network environment 1500 can communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 can communicate with the electronic device 1504 via the server 1508. According to an embodiment, the electronic device 1501 can include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 can execute, for example, software (e.g., a program 1540) to control at least one other component (e.g., a hardware or software component) of the electronic device 1501 coupled with the processor 1520, and can perform various data processing or computation. According to one embodiment, as at least part of the data processing or computation, the processor 1520 can load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 can include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 can be adapted to consume less power than the main processor 1521, or to be specific to a specified function. The auxiliary processor 1523 can be implemented as separate from, or as part of the main processor 1521.

The auxiliary processor 1523 can control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) can be implemented as part of another component (e.g., the camera module 1580 or the communication module 1590) functionally related to the auxiliary processor 1523.

The memory 1530 can store various data used by at least one component (e.g., the processor 1520 or the sensor module 1576) of the electronic device 1501. The various data can include, for example, software (e.g., the program 1540) and input data or output data for a command related thereto. The memory 1530 can include the volatile memory 1532 or the non-volatile memory 1534.

The program 1540 can be stored in the memory 1530 as software, and can include, for example, an operating system (OS) 1542, middleware 1544, or an application 1546.

The input device 1550 can receive a command or data to be used by another component (e.g., the processor 1520) of the electronic device 1501, from the outside (e.g., a user) of the electronic device 1501. The input device 1550 can include, for example, a microphone, a mouse, a keyboard, or a digital pen (e.g., a stylus pen).

The sound output device 1555 can output sound signals to the outside of the electronic device 1501. The sound output device 1555 can include, for example, a speaker or a receiver. The speaker can be used for general purposes, such as playing multimedia or playing record, and the receiver can be used for an incoming calls. According to an embodiment, the receiver can be implemented as separate from, or as part of the speaker.

The display device 1560 can visually provide information to the outside (e.g., a user) of the electronic device 1501. The display device 1560 can include, for example, a display, a hologram device, or a projector and control circuitry to control a corresponding one of the display, hologram device, and projector. According to an embodiment, the display device 1560 can include touch circuitry adapted to detect a touch, or sensor circuitry (e.g., a pressure sensor) adapted to measure the intensity of force incurred by the touch.

The audio module 1570 can convert a sound into an electrical signal and vice versa. According to an embodiment, the audio module 1570 can obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 can detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 can include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 can support one or more specified protocols to be used for the electronic device 1501 to be coupled with the external electronic device (e.g., the electronic device 1502) directly (e.g., wiredly) or wirelessly. According to an embodiment, the interface 1577 can include, for example, a high definition multimedia interface (HDMI), a universal serial bus (USB) interface, a secure digital (SD) card interface, or an audio interface.

A connecting terminal 1578 can include a connector via which the electronic device 1501 can be physically connected with the external electronic device (e.g., the electronic device 1502). According to an embodiment, the connecting terminal 1578 can include, for example, a HDMI connector, a USB connector, a SD card connector, or an audio connector (e.g., a headphone connector).

The haptic module 1579 can convert an electrical signal into a mechanical stimulus (e.g., a vibration or a movement) or electrical stimulus which may be recognized by a user via his tactile sensation or kinesthetic sensation. According to an embodiment, the haptic module 1579 can include, for example, a motor, a piezoelectric element, or an electric stimulator.

The camera module 1580 can capture a still image or moving images. According to an embodiment, the camera module 1580 can include one or more lenses, image sensors, image signal processors, or flashes.

The power management module 1588 can manage power supplied to the electronic device 1501. According to one embodiment, the power management module 1588 can be implemented as at least part of, for example, a power management integrated circuit (PMIC).

The battery 1589 can supply power to at least one component of the electronic device 1501. According to an embodiment, the battery 1589 can include, for example, a primary cell which is not rechargeable, a secondary cell which is rechargeable, or a fuel cell.

The communication module 1590 can support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 can include one or more communication processors that are operable independently from the processor 1520 (e.g., the application processor (AP)) and supports a direct (e.g., wired) communication or a wireless communication. According to an embodiment, the communication module 1590 can include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules can communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 can identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 can transmit or receive a signal or power to or from the outside (e.g., the external electronic device) of the electronic device 1501. According to an embodiment, the antenna module 1597 can include an antenna including a radiating element composed of a conductive material or a conductive pattern formed in or on a substrate (e.g., PCB). According to an embodiment, the antenna module 1597 can include a plurality of antennas. In such a case, at least one antenna appropriate for a communication scheme used in the communication network, such as the first network 1598 or the second network 1599, can be selected, for example, by the communication module 1590 (e.g., the wireless communication module 1592) from the plurality of antennas. The signal or the power can then be transmitted or received between the communication module

1590 and the external electronic device via the selected at least one antenna. According to an embodiment, another component (e.g., a radio frequency integrated circuit (RFIC)) other than the radiating element can be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data can be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, can request the one or more external electronic devices to perform at least part of the function or the service. The one or more external electronic devices receiving the request can perform the at least part of the function or the service requested, or an additional function or an additional service related to the request, and transfer an outcome of the performing to the electronic device 1501. The electronic device 1501 can provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, as a gesture of a user is recognized by synthetically using a plurality of sensor signals sensed by a plurality of sensors, a gesture that only a finger moves finely with a wrist fixed may be accurately recognized.

Also, according to various embodiments of the disclosure, as a sensor signal is corrected in consideration of various environmental factors of the user wearing a wearable device, a gesture of the user may be accurately recognized without limitation on an environment and a situation.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a display disposed in at least a portion of the housing;
   a sensor unit including a first sensor and a second sensor; and
   a processor operatively connected with the sensor unit,
   wherein the processor is configured to:
      determine whether to change a screen of the display from an off state to an on state, by using a first sensor signal of a user sensed by the first sensor;
      while the screen of the display maintains the off state, control the first sensor to sense the first sensor signal at a first cycle and control the second sensor to sense a second sensor signal from the user at a second cycle longer than the first cycle of the first sensor;
      in response to identifying that the screen of the display changes to the on state, control the second sensor to sense the second sensor signal at a third cycle shorter than the second cycle;
      identify a start point of a gesture signal interval for the first sensor signal and a start point of a gesture signal interval for the second sensor signal, wherein the start point of the gesture signal interval for the first sensor signal is different from the start point of the gesture signal interval for the second sensor signal;
      synchronize the first sensor signal and the second sensor signal temporally in a manner that start points of gesture signal intervals respectively included in the first sensor signal and the second sensor signal are identical;
      sense a pose of the user by using at least one of the first sensor signal and the second sensor signal;
      detect correction-required signal intervals respectively included in the first sensor signal and the second sensor signal based on amplitudes of the first sensor signal and the second sensor signal, depending on the sensed pose of the user; and
      exclude the correction-required signal intervals respectively detected in the first sensor signal and the second sensor signal from a gesture recognition target; and
      recognize a gesture of the user by using the first sensor signal sensed every first cycle and the second sensor signal sensed every third cycle.

2. The electronic device of claim 1, wherein the processor is further configured to:
   while the screen of the display maintains the off state, recognize the gesture of the user by using only the first sensor signal.

3. The electronic device of claim 1, wherein the processor is further configured to:
   when the screen of the display maintains the on state, maintain the second sensor in a state of sensing the second sensor signal every third cycle, and
   at a time when the screen of the display changes from the on state to the off state, again change a cycle, at which the second sensor senses the second sensor signal, from the third cycle to the second cycle.

4. The electronic device of claim 1, wherein the sensor unit includes at least one of an acceleration sensor, a photoplethysmography (PPG) sensor, a gyro sensor, a geomagnetic sensor, and an electrocardiogram sensor.

5. The electronic device of claim 1, wherein:
   at least one of the first sensor signal and the second sensor signal includes a heartbeat signal of the user, and
   the processor is further configured to filter the heartbeat signal to remove a DC component indicating a linear characteristic of the heartbeat signal.

6. The electronic device of claim 1, wherein the processor is further configured to:
   sense a pose of the user by using at least one of the first sensor signal and the second sensor signal;
   detect correction-required signal intervals respectively included in the first sensor signal and the second sensor signal based on amplitudes of the first sensor signal and the second sensor signal, depending on the sensed pose of the user; and
   perform correction on the correction-required signal intervals detected.

7. The electronic device of claim 1, wherein the processor is further configured to:
   determine whether it is possible to recognize the gesture, with regard to each of the first sensor signal and the second sensor signal;
   determine a validity for recognition of the gesture with respect to each of the first sensor signal and the second sensor signal, based on whether it is possible to recognize the gesture; and
   exclude a signal, in which the determined validity is less than a reference value, from among the first sensor signal and the second sensor signal from a gesture recognition target.

8. The electronic device of claim 7, wherein the processor is further configured to determine whether it is possible to recognize the gesture, by using at least one of a signal-to-noise ratio (SNR), a result of analyzing patterns of the first sensor signal and the second sensor signal, and a result of comparing the first sensor signal and the second sensor signal.

9. The electronic device of claim 7, wherein:
   at least one of the first sensor signal and the second sensor signal includes an acceleration signal of the user, and
   the processor is further configured to segment the acceleration signal based on an x-axis, a y-axis, and a z-axis and determines the validity of each of the segmented acceleration signals, independently.

10. The electronic device of claim 1, wherein the processor is further configured to independently set end points of the gesture signal intervals respectively included in the first sensor signal and the second sensor signal.

11. The electronic device of claim 1, wherein the processor is further configured to:
    select feature value lists respectively corresponding to the first sensor and the second sensor from among feature value lists stored in advance, and
    extract feature values associated with the gesture of the user from the first sensor signal and the second sensor signal by using the selected feature value lists.

12. The electronic device of claim 11, wherein the processor is further configured to:
    input the extracted feature values to a gesture classification model learned in advance to recognize the gesture of the user, and
    when the extracted feature values are not values not learned by the gesture classification model, output a guidance message indicating a fail in recognition of the gesture of the user.

13. The electronic device of claim 1, wherein the processor is paired with at least one external electronic device.

14. The electronic device of claim 13, wherein, when the processor is paired with the at least one external electronic device, the processor is further configured to perform at least one of operations for recognizing the gesture of the user by using the at least one external electronic device paired.

15. The electronic device of claim 13, wherein, when the processor is paired with the at least one external electronic device, the processor is further configured to set a gesture set for recognizing the gesture of the user depending on a kind of the at least one external electronic device paired.

16. The electronic device of claim 13, wherein:
    at least one of the first sensor signal and the second sensor signal includes an acceleration signal,
    the at least one external electronic device is an in-vehicle infotainment system, and
    when variations in the acceleration signal exceed a threshold value in a state of being paired with the in-vehicle infotainment system, the processor is further configured to exclude the acceleration signal from a gesture recognition target.

17. The electronic device of claim 1, wherein:
    the sensor unit further includes a position sensor configured to sense position information of the user, and
    the processor is further configured to set a gesture set for recognizing the gesture of the user by using the position information of the user.

\* \* \* \* \*